United States Patent
Ahn et al.

(10) Patent No.: US 9,870,139 B2
(45) Date of Patent: Jan. 16, 2018

(54) PORTABLE APPARATUS AND METHOD FOR SHARING CONTENT WITH REMOTE DEVICE THEREOF

(71) Applicant: SAMSUNG ELECTRONICS CO., LTD., Suwon-si (KR)

(72) Inventors: Hyo-in Ahn, Seoul (KR); Eun-kyung Yoo, Seoul (KR); Ji-su Jung, Yongin-si (KR); Dong-goo Kang, Seoul (KR); Say Jang, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 328 days.

(21) Appl. No.: 14/564,684

(22) Filed: Dec. 9, 2014

(65) Prior Publication Data

US 2015/0180916 A1 Jun. 25, 2015

(30) Foreign Application Priority Data

Dec. 20, 2013 (KR) .................. 10-2013-0160222

(51) Int. Cl.
*G06F 17/22* (2006.01)
*G06F 3/0488* (2013.01)
*G06F 3/0484* (2013.01)

(52) U.S. Cl.
CPC ........ *G06F 3/0488* (2013.01); *G06F 3/04845* (2013.01); *G06F 3/04883* (2013.01)

(58) Field of Classification Search
CPC . G06F 3/04845; G06F 3/04883; G06F 3/0488
See application file for complete search history.

(56) References Cited

U.S. PATENT DOCUMENTS

| 7,542,077 | B2 * | 6/2009 | Miki | H04N 9/735 348/223.1 |
| 7,614,599 | B2 * | 11/2009 | Moon | H04M 1/04 248/454 |
| 8,432,456 | B2 * | 4/2013 | Armstrong | H04N 1/00212 348/143 |
| 8,632,041 | B2 * | 1/2014 | Ahn | H04M 1/04 248/309.1 |
| 2006/0146765 | A1 * | 7/2006 | Van De Sluis | G06F 3/016 370/338 |
| 2007/0210172 | A1 * | 9/2007 | Moon | H04M 1/04 235/486 |
| 2007/0281667 | A1 * | 12/2007 | Minor | H04L 67/06 455/414.1 |
| 2010/0200721 | A1 * | 8/2010 | Ahn | F16M 13/00 248/346.04 |
| 2010/0313143 | A1 * | 12/2010 | Jung | G06F 3/1446 715/753 |
| 2011/0029610 | A1 * | 2/2011 | Chao | G06F 17/30209 709/204 |

(Continued)

*Primary Examiner* — Maikhanh Nguyen
(74) *Attorney, Agent, or Firm* — Sughrue Mion, PLLC

(57) ABSTRACT

A method for sharing content in a portable apparatus with a remote device includes receiving user interaction with a document targeted for photographing through a camera of the portable apparatus; and transmitting information of a content corresponding to the document with at least one remote device so as to correspond to the user interaction with the document. The user interaction with the contents of the portable apparatus input through the camera is shared with the remote device.

16 Claims, 17 Drawing Sheets

(56) References Cited

U.S. PATENT DOCUMENTS

2011/0310257 A1* 12/2011 Armstrong ......... H04N 1/00212
348/207.1
2012/0072853 A1* 3/2012 Krigstrom ............. G06F 3/0488
715/748
2013/0235347 A1 9/2013 Hennessey et al.

* cited by examiner

FIG. 10
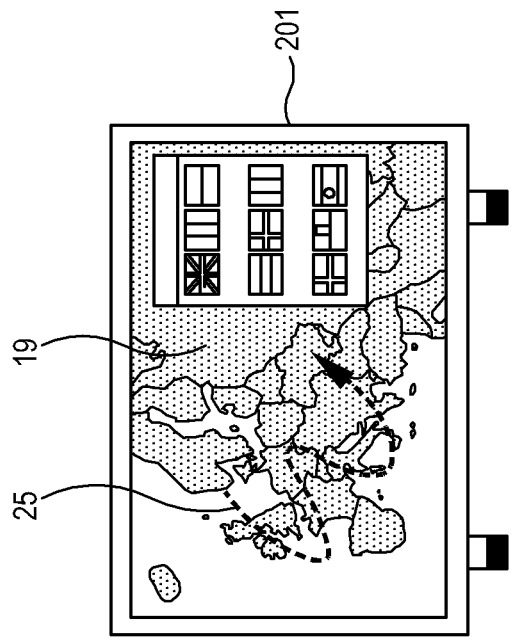
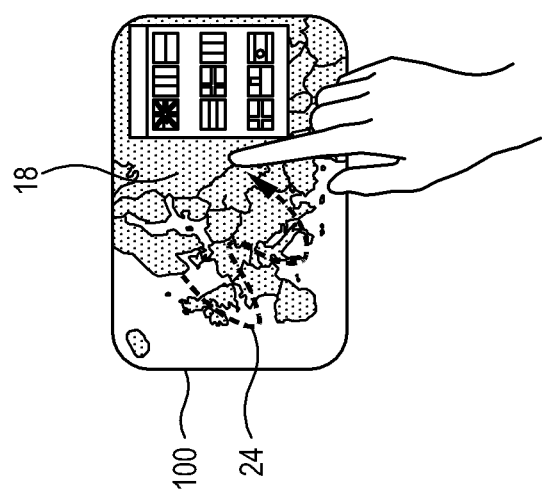

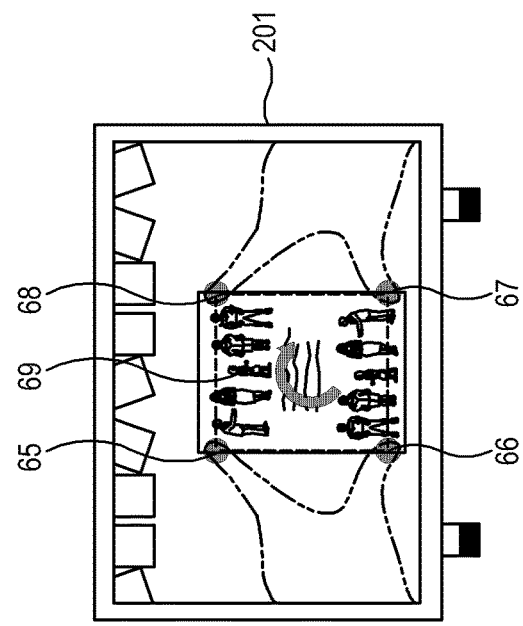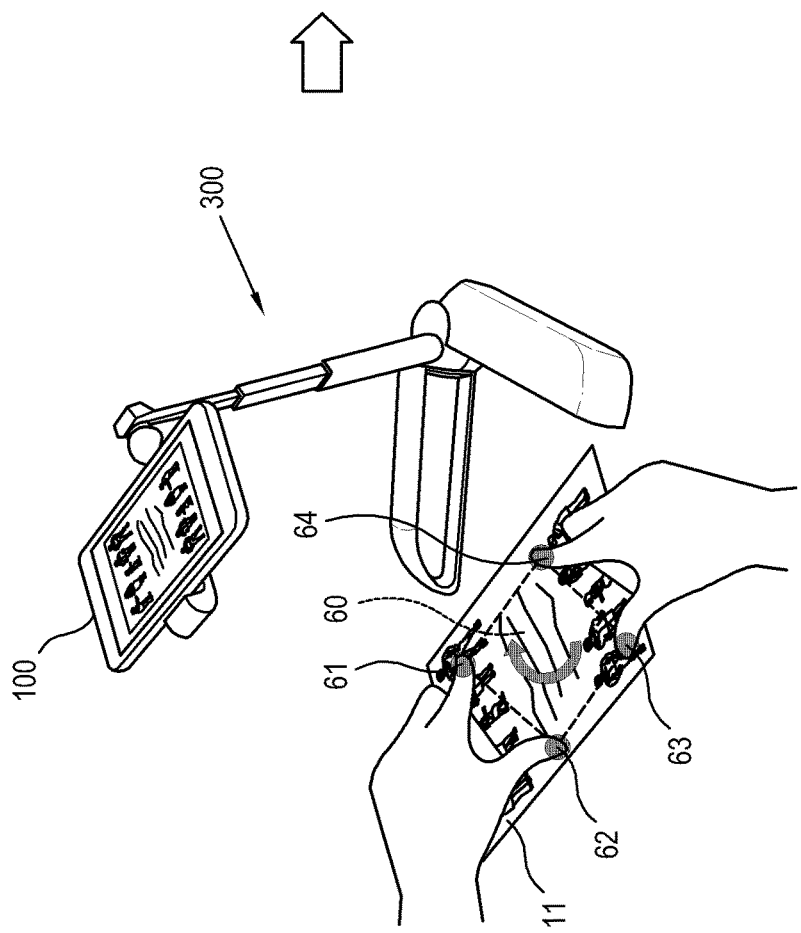
FIG. 12

PORTABLE APPARATUS AND METHOD FOR SHARING CONTENT WITH REMOTE DEVICE THEREOF

CROSS-REFERENCE TO RELATED APPLICATION

This application claims priority from Korean Patent Application No. 10-2013-0160222, filed on Dec. 20, 2013 in the Korean Intellectual Property Office, the disclosure of which is incorporated herein by reference.

BACKGROUND

Field

Apparatuses and methods consistent with the exemplary embodiments relate to a portable apparatus and a method for sharing content thereof, and more particularly to a portable apparatus and a method for sharing content thereof, in which the contents are shared between remote devices.

Description of the Related Art

A visual presenter, which receives various real images and transmits the images to peripheral devices, has been widely used as an auxiliary device for conducting lectures. For example, the visual presenter is connected to a television (TV) or a large format monitor and effectively delivers material in order to explain teaching materials or aids, samples, etc., and if there is a projector, the visual presenter is connected to the projector and utilized for education and lectures by largely projecting an image on to a screen. Also, the visual presenter (i.e. presentation station) may be connected to a personal computer (PC) and captures and stores a still or moving image to be used in creating a lecture material.

However, the visual presenter has disadvantages in that it may be expensive, complicated and time-consuming to operate. The visual presenter may also be difficult to transport, and it may be difficult to view the shared learning materials at long distances. It may also be difficult and complicated for teachers to create and share learning contents, etc. Therefore, problems may arise in that students lose concentration in class and the class may be interrupted by these students.

As portable apparatuses such as smart phones, tablet personal computers (PC), etc. have recently been widely used, services and functions of the portable apparatuses have become varied. For example, with the development of wireless networks, and to meet various demands of users, there have been developed technologies for sharing data (e.g., music, moving images, etc.) between one portable apparatus and another portable apparatus (e.g., a remote device), for allowing one portable apparatus to control another portable apparatus (e.g., to execute a moving image, etc.), and so on.

Accordingly, instead of the visual presenter only being used in an educational environment, there is rising interest and demand on constructing a smart educational environment where data is shared among the plurality of portable apparatuses or between the portable apparatus and the remote device (e.g., a common device) to be controlled by the portable apparatus, a screen is displayed on the portable apparatus (i.e. a main control device) in order to control the remote device and the displayed screen is used.

SUMMARY

According to an aspect of another exemplary embodiment, a method of sharing contents in a portable apparatus includes: receiving user interaction with a document targeted for being photographed with a camera of the portable apparatus; and sharing content corresponding to the document with at least one remote device so that the user interaction of the document displayed on the remote device corresponds to the user interaction with the document photographed by the portable apparatus.

The user interaction may include a user's hand gesture performed on the document.

The user interaction may include a continuous motion in a predetermined direction.

The method may further include: displaying a content corresponding to the document on a touch screen of the portable apparatus; and receiving a user interaction with the touch screen, wherein the sharing the content includes sharing the content with the at least one remote device so that the image displayed on the remote device corresponds to the document receiving the user interaction on the touch screen.

The sharing the content may include sharing the content with a remote device, among a plurality of remote devices, which is set up to correspond to a motion direction of user interaction with the document or touch screen of the portable apparatus.

The sharing the content may include sharing the content with a remote device of a user, who belongs to a group set up to correspond to a motion direction of user interaction with the document or touch screen, among a plurality of remote devices.

The motion direction of the user interaction with the touch screen may include an edge direction of the touch screen.

The method may further include: displaying a pointer corresponding to a user interaction with the document or touch screen on a content of the touch screen; and transmitting a command to the remote device so as to synchronize a content displayed on the remote device with a content displayed on the touch screen.

The method may further include: detecting a position of a user interaction with the document or touch screen; setting up a virtual point corresponding to the detected position; and editing a content of an object area set up with the virtual point.

The editing may include at least one among position change, size adjustment, rotation, copy and cut of a content corresponding to the object area.

The setting up the virtual point may include setting up the object area with a plurality of virtual points.

The setting up the virtual point may include setting up the object area in accordance with a continuous motion of one virtual point.

The method may further include: generating a composite content by merging the edited content with a different content; and transmitting the composite content to the remote device so as to be shared with the remote device.

The method may further include loading a content targeted for editing by controlling the touch screen.

The method may further include: sensing a double tap on the touch screen; displaying a menu item on the touch screen based on the sensed double tap; and selecting the content targeted for editing from the menu item.

The method may further include: sensing a tap on the touch screen; capturing an image from a screen displayed on the touch screen where the tap is sensed; and transmitting the captured image to the remote device so as to be shared with the remote device.

The transmitted capture image may be displayed on a preset area of a display of the remote device and selectable by a user.

The preset area may display an image list including a plurality of captured images, and the image list can be hidden.

The portable apparatus may be mounted to a portable cradle including a holder which is adjustable in different angles to correspond to an orientation of the camera, and is adjustable in width to correspond to the size of the portable apparatus, a support which is adjustable in height, and a base which supports the holder and the support.

The remote device may include an electronic board or another portable apparatus.

According to an aspect of another exemplary embodiment, a portable apparatus configured to communicate with at least one remote device comprises: a communicator which is configured to communicate with an external device; a camera which is configured to receive a document targeted for being photographed as an input image; a display which is configured to include a touch screen to receive a user's touch input; and a controller which is configured to sense a user interaction with the document received through the camera, and control the communicator to transmit a content corresponding to the received document to at least one remote device so that the user interaction on the document displayed on the remote device corresponds to the user interaction of the document photographed by the portable apparatus.

The user interaction may include a user's hand gesture performed on the document.

The user interaction may include a continuous motion in a predetermined direction.

The controller may display a content corresponding to the document on a touch screen of the portable apparatus, and controls the communicator to share the content with the at least one remote device so that the user interaction of the content shared with the remote device correspond to user interaction of the document on the touch screen when receiving the user interaction with the touch screen.

The controller may control the communicator to share the content with a remote device, among a plurality of remote devices, which is set up to correspond to a motion direction of user interaction with the document or touch screen.

The controller may control the communicator to share the content with a remote device of a user, who belongs to a group set up to correspond to a moving direction of user interaction with the document or touch screen, among a plurality of remote devices.

The motion direction of the user interaction with the touch screen may include an edge direction of the touch screen.

The controller may control the display to display a pointer corresponding to a user interaction with the document or touch screen on a content of the touch screen, and may control the communicator to transmit a command to the remote device so as to synchronize a content displayed on the remote device with a content displayed on the touch screen.

The controller may detect a position of user interaction with the document or touch screen, set up a virtual point corresponding to the detected position, and edit a content of an object area set up with the virtual point.

The edit may include at least one among position change, size adjustment, rotation, copy and cut of a content corresponding to the object area.

The controller may set up the object area with a plurality of virtual points.

The controller may set up the object area in accordance with a continuous motion of one virtual point.

The controller may generate a composite content by merging the edited content with a different content, and control the communicator to transmit the composite content to the remote device so as to be shared with the remote device.

The portable apparatus may further include a storage which is configured to store a content targeted for editing, wherein the controller loads the content targeted for editing in response to a user's control on the touch screen.

The controller may sense a double tap on the touch screen, display a menu item on the touch screen based on the sensed double tap, and select the content targeted for editing from the menu item.

The controller may sense a tap on the touch screen, capture an image from a screen displayed on the touch screen where the tap is sensed, and control the communicator to transmit the captured image to the remote device so as to be shared with the remote device.

The transmitted capture image may be displayed on a preset area of a display of the remote device and is selectable by a user.

The preset area may display an image list including a plurality of captured images, and the image list can be hidden.

The portable apparatus may be mounted to a portable cradle including a holder which is adjustable in different angles to correspond to an orientation of the camera and is adjustable in width to correspond to the size of the portable apparatus, a support which is adjustable in height, and a base which supports the holder and the support.

The remote device may include an electronic board or another portable apparatus.

BRIEF DESCRIPTION OF THE DRAWINGS

The above and/or other aspects will become apparent and more readily appreciated from the following description of exemplary embodiments, taken in conjunction with the accompanying drawings, in which:

FIGS. 7 to 15 show examples of content sharing interaction in the portable apparatus according to an exemplary embodiment.

DETAILED DESCRIPTION OF EXEMPLARY EMBODIMENTS

Below, exemplary embodiments will be described in detail with reference to accompanying drawings.

Figure 1:
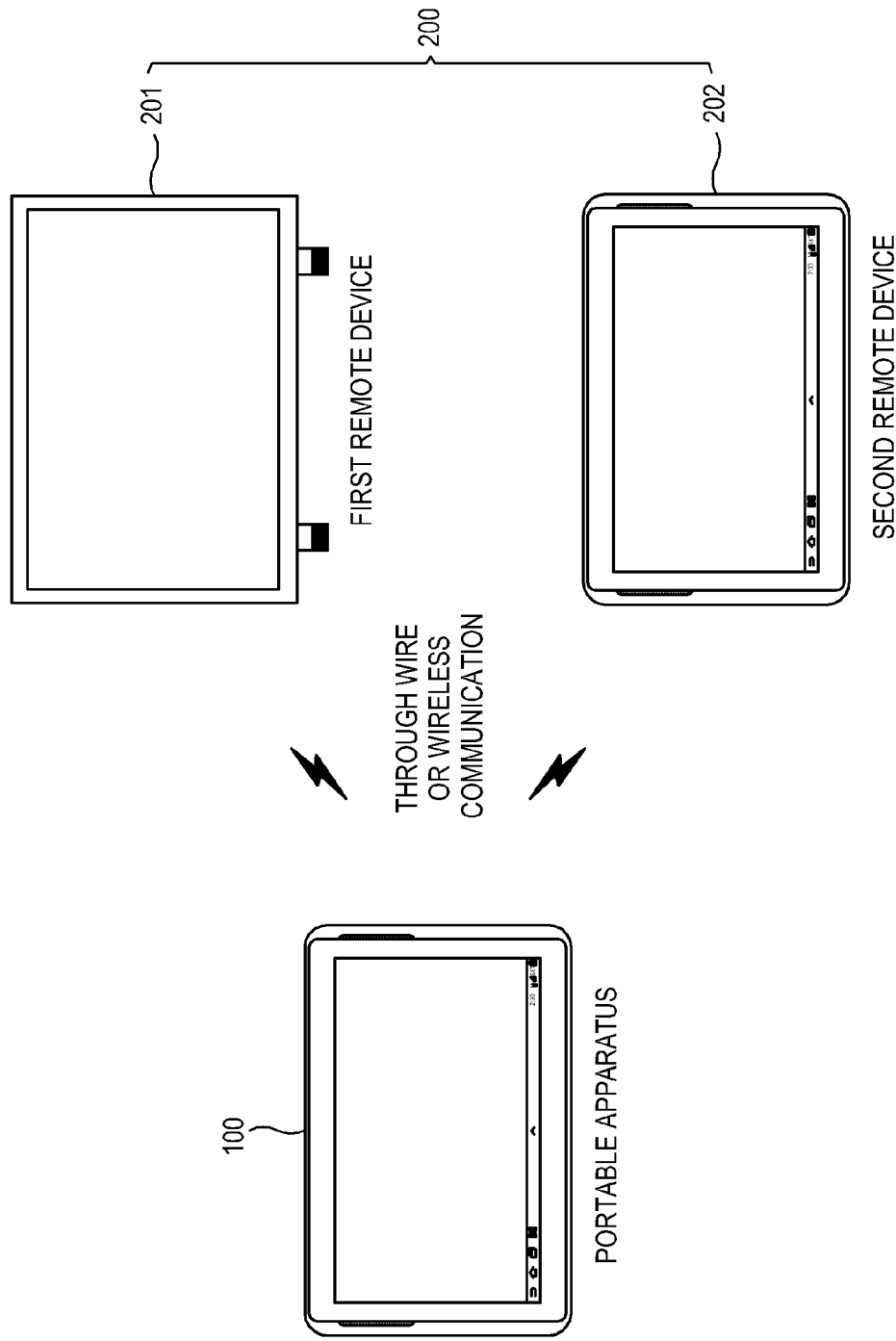
FIG. 1 is a block diagram showing a content sharing system according to an exemplary embodiment.

FIG. 1 is a block diagram showing a content sharing system according to an exemplary embodiment.

As shown in FIG. 1, the content sharing system according to an exemplary embodiment includes a portable apparatus 100, and a plurality of remote devices 200.

The portable apparatus 100 is achieved by a mobile phone (e.g., a smart phone), a table PC or similar digital device, and displays a content corresponding to an input image received through an image sensor 150 (FIG. 6) on a display 190 (FIG. 4) having a touch screen 191. The corresponding content is transmitted to at least one remote device (e.g., 201) among the plurality of remote devices 200 in response to interaction with the touch screen 191, so that a streaming content can be shared between the portable apparatus 100 and the corresponding remote device 201.

In this exemplary embodiment, the portable apparatus 100 serves as a main control device with regard to the plurality of remote devices 200, and serves as a common device for monitoring operations of the remote device 200.

The remote device 200 receives and shares the content from the portable apparatus 100, and may be achieved by a mobile phone (e.g., a smart phone), a tablet PC or similar portable apparatus 202, or an electronic board (e.g., Interactive Whiteboard (IWB) or similar display apparatus. However, the remote devices are not limited thereto. If the remote device is achieved by the portable apparatus 202, the configuration of the portable apparatus 100 to be described later and shown in FIGS. 4 to 6 may be equally applied to those of the corresponding remote device 202.

In this exemplary embodiment, the portable apparatus 100 of FIG. 1 is a teacher portable apparatus which is mounted to a cradle (to be described later) and may server as a visual presenter. A content corresponding to an input image of the portable apparatus 100 is shared with a teacher and/or a student through the remote device 200. The information stored in the remote devices 201 and 202 can be accessed and updated though the portable apparatus 100. The remote devices 201 and 202 may be achieved by various devices present in a classroom.

According to an exemplary embodiment, the content sharing system may be provided to perform cooperative leaning (or group study) as a kind of teaching method In other words, an assignment that individual students of the class or a small group in the class cooperatively act to accomplish as a common learning goal.

The portable apparatus 100 and the remote devices 201 and 202 are connected to each other using their respective communicators through wired or wireless communication. FIG. 1 shows an example of including two remote devices 201 and 202 for convenience. However, the exemplary embodiment is not limited thereto. Alternatively, the content sharing system according to an exemplary embodiment may include three or more remote devices 200.

Figure 2:
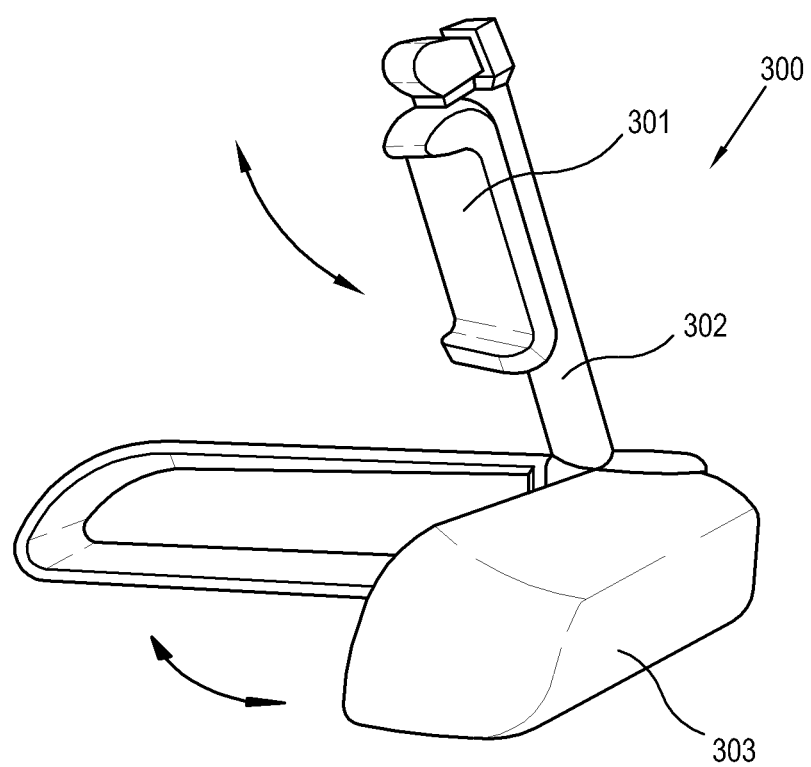
FIG. 2 is a perspective view showing a cradle to which a portable apparatus according to an exemplary embodiment is mounted.
Figure 3:
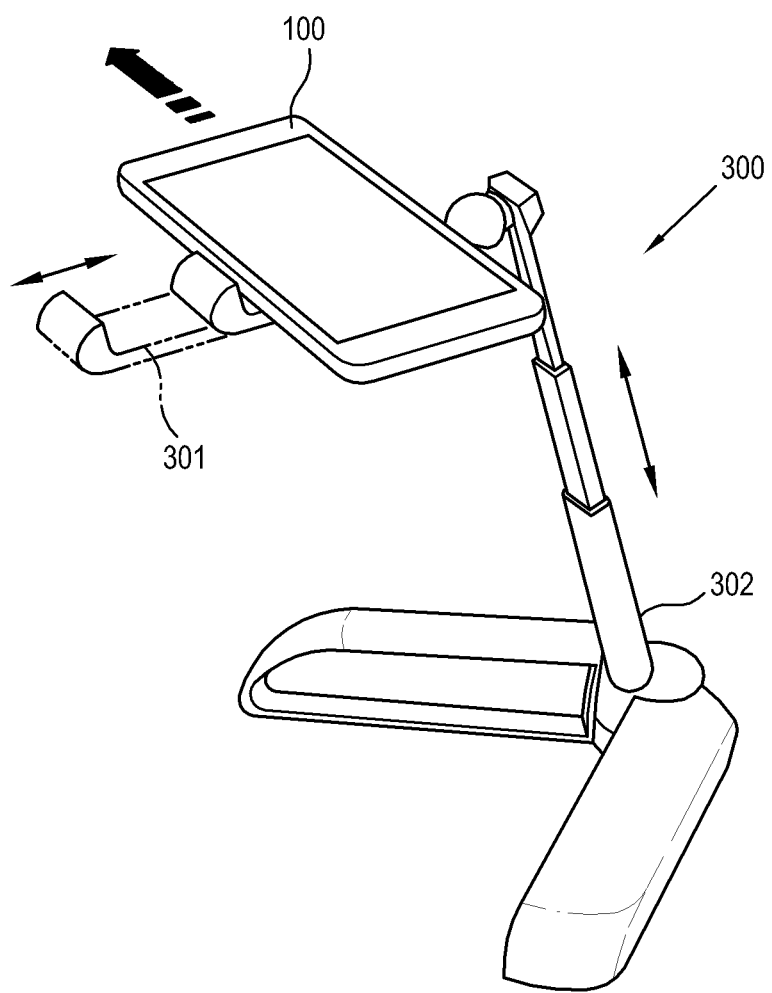
FIG. 3 is a perspective view showing an example where the portable apparatus is mounted to the cradle of FIG. 2.

FIG. 2 is a perspective view showing a cradle 300 to which a portable apparatus 100 according to an exemplary embodiment is mounted, and FIG. 3 is a perspective view showing an example where the portable apparatus 100 is mounted to the cradle 300 of FIG. 2.

In this exemplary embodiment, the cradle 300 is portable accessory which may be used by a user of the portable apparatus 100. The cradle includes a holder 301 to which the portable apparatus 100 is mounted, a support 302 connected to the holder 301, and a base 303 supporting the holder 301 and the support 302.

The holder 301 is adjustable in different directions and angles to facilitate an image input of the image sensor 150 as shown in FIG. 2, and is adjustable in its width corresponding to the size of the portable apparatus 100 as shown in FIG. 3.

The support 302 connects the holder 301 with the base 303, and is designed to be adjustable in height as shown in FIG. 3. Also, the base 303 is designed in the form of being opened and closed from side to side as shown in FIG. 2.

Thus, the cradle 300 in this exemplary embodiment can be easily set by a user, may be portable while being lifted with one hand, and may be conveniently used as an auxiliary device for a lecture when it is coupled to the portable apparatus 100.

Figure 4:
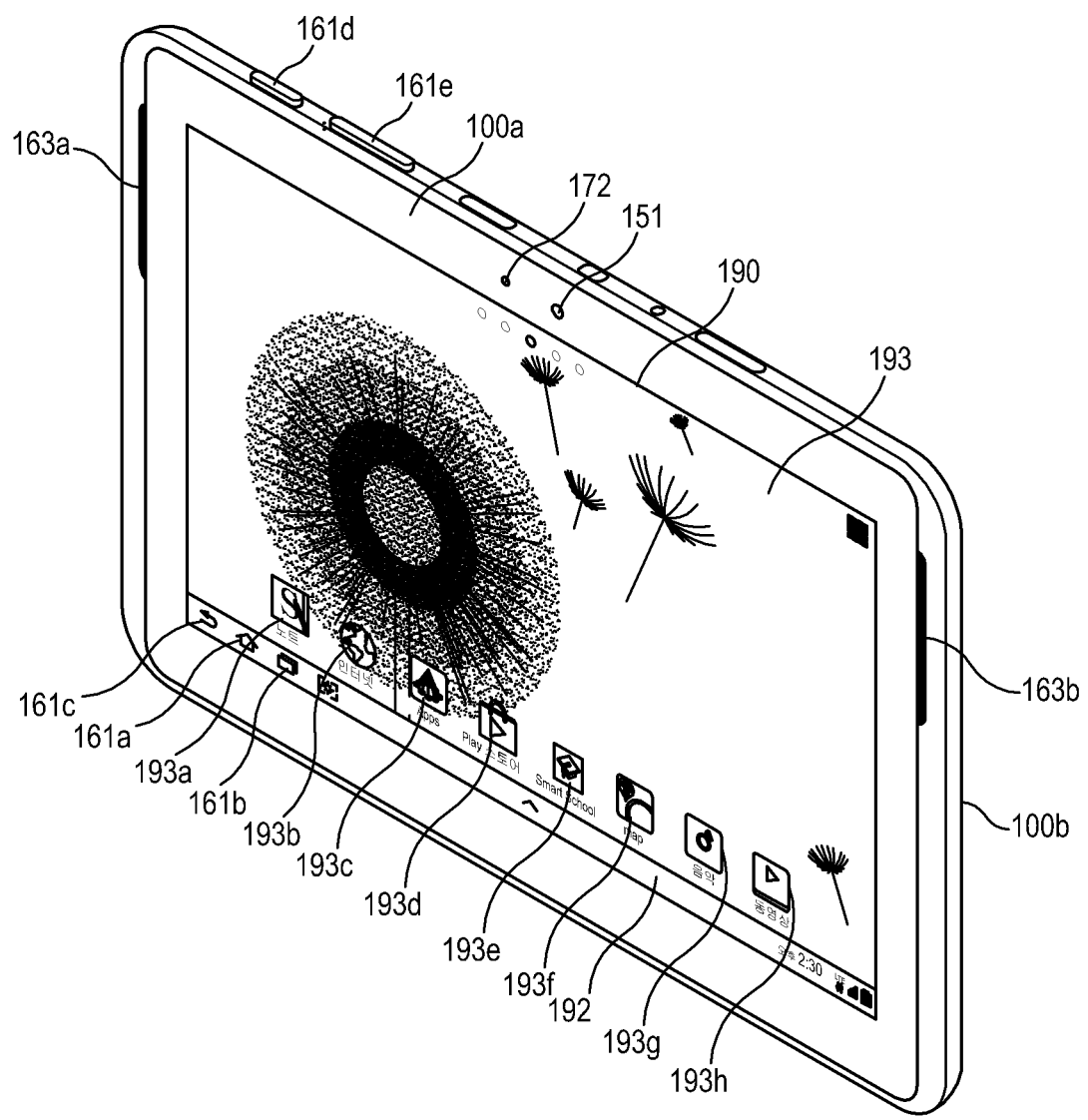
FIG. 4 is a front perspective view schematically showing the portable apparatus according to an exemplary embodiment.
Figure 5:
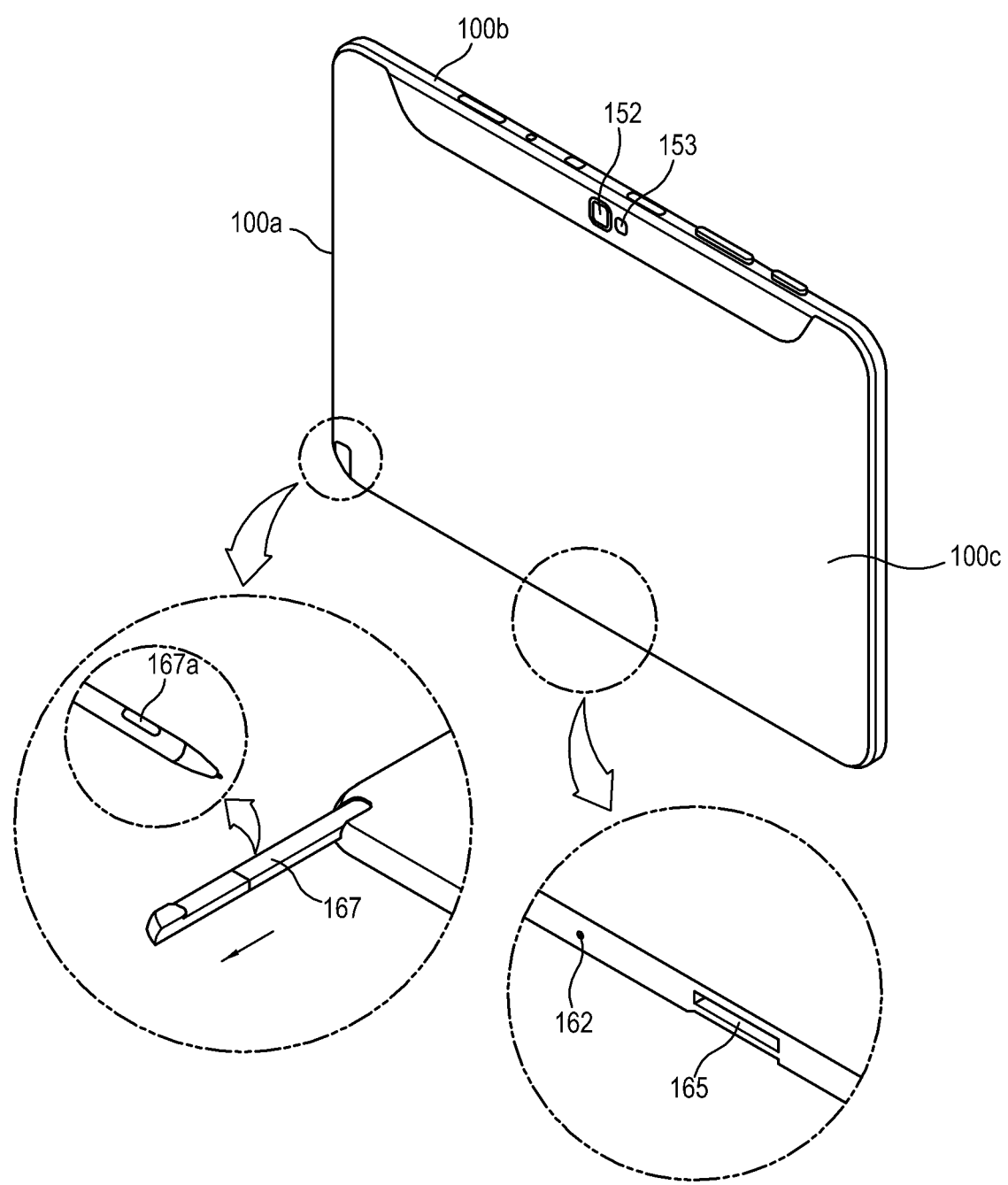
FIG. 5 is a rear perspective view schematically showing the portable apparatus according to an exemplary embodiment.
Figure 6:
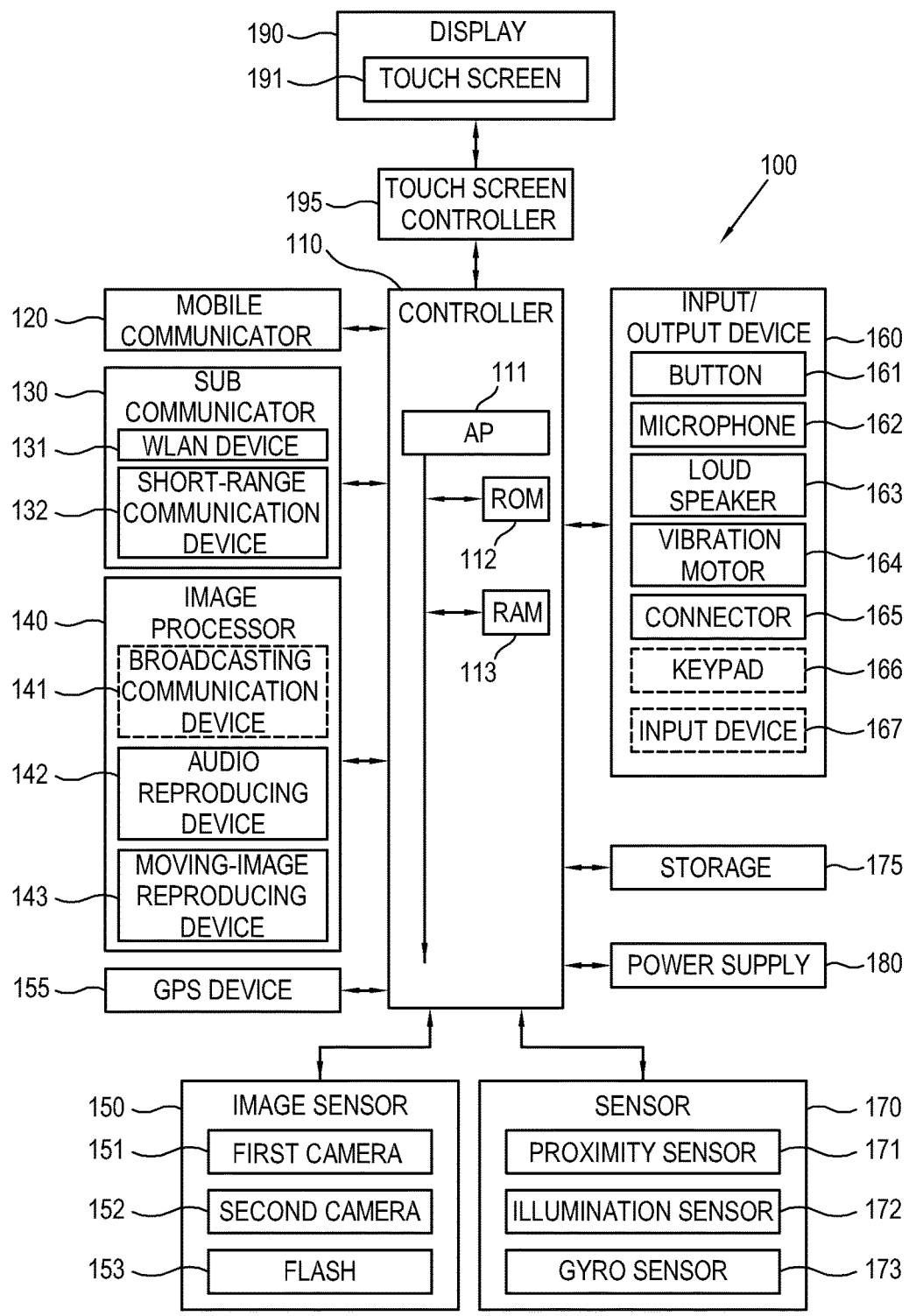
FIG. 6 is a block diagram showing the portable apparatus of FIGS. 4 and 5.

FIGS. 4 and 5 illustrate that the portable apparatus 100 is achieved by the tablet PC, and the portable apparatus 100 may include elements of FIG. 6 even when it is achieved by a mobile phone such as a smart phone. Also, the elements of the portable apparatus 100 shown in FIGS. 4 and 6 may be applied to the remote device 202 achieved by the portable apparatus.

As shown in FIGS. 4 and 5, the portable apparatus 100 includes a display 190 in a center region of a front side 100a thereof, and the display 190 includes a touch screen 191. FIG. 4 shows an example that a home screen 193 is displayed on the touch screen 191 when a user logs in to the portable apparatus 100. The portable apparatus 100 may have a plurality of different home screens. The home screen 193 may include shortcut icons 193a to 193h corresponding to applications selectable by a touch, and a weather widget (not shown), a clock widget (not shown), etc.

The application refers to software executed on an operating system (OS) for a computer or a mobile OS and directly used by a user. For example, the applications may include a word processor, a spreadsheet, a social network system (SNS), chatting, a map, a music player, a moving image player, etc.

The widget refers to one of graphic user interfaces (GUIs), i.e., a mini application for supporting smoother interaction between a user and the application or the operating system (OS). For example, there are a weather widget, a calculator widget, a clock widget, etc. The widget may be made in the form of the shortcut icon and installed to a desk top or a portable apparatus, a blog, a café, a personal homepage, etc. The widget allows a corresponding service to be directly used by a clicking operation without passing through a web browser. Also, the widget may include a shortcut menu for directly going to a designated path or a shortcut icon for executing a designated application.

The foregoing application, widget, etc. may be installed in the display apparatus 201 as well as the portable apparatus 100. In this exemplary embodiment, a user selects and executes a predetermined application installed in the portable apparatus 100, for example, an educational application 193e, and thus displays a content corresponding to an input image of the image sensor 150 on the display 190 and/or shares it with the remote device 200.

In a lower end of the home screen 191, a status bar 392 may be displayed to show a state of the portable apparatus 100 such as a battery charged state, intensity of a received signal, a current time, etc. Also, in accordance with operating systems (OS), the portable apparatus 100 may display the home screen 191 in an upper end of the status bar or not display the status bar 192.

In an upper portion of the front side 100a of the portable apparatus 100, a first camera 151, a plurality of loud speakers 163a and 163b, a proximity sensor 171 and an illumination sensor 172 may be provided. In a rear side 100c of the portable apparatus 100, a second camera 152 and an optional flash 353 may be placed. The first camera 151 and the second camera 152 are included in an image sensor 150 for recognizing a real document targeted for photographing, and user interaction with the image. Here, the user interaction includes a user's hand gesture performed on the document targeted for photographing.

In a lower portion of the home screen 193 within the touch screen 191 on the front side 100a of the portable apparatus 100, a home button 161a, a menu button (not shown), and a back button 161c are placed. Here, the button 161 may be achieved by not a physical button but a touch button. Also, the button 161 may be displayed together with a text or another icon within the touch screen 191.

In an upper lateral side 100b of the portable apparatus 100, for example a power/lock button 161d, a volume control button 161e, one or plural microphones 162, etc. may be placed. A connector 165 provided in a lower lateral side of the portable apparatus 100 may connect with an external device through a wire. Also, in the lower lateral side of the portable apparatus 100, an insertion hole in which an input device 167 having a button 168a is inserted. The input device 167 may be kept inside the portable apparatus 100 through the insertion hole, and taken out from the portable apparatus 100 when used. The portable apparatus 100 may receive a user's touch input on the touch screen 191 through the input device 167, and the input device 167 is included in the input/output device 160 of FIG. 6.

In this exemplary embodiment, the input device may be defined to include a button 161, a keypad 166, and the input device 167. The input device may receive a touch based on a user's body, e.g., a finger on the touch screen 191. The input device transmits various preset control commands or information to the controller 110 in accordance with a user's input including the touch input.

Referring to FIGS. 4 to 6, the portable apparatus 100 may connect with the external device through the mobile communicator 120, the sub communicator 130 and the connector 165 through a wire or wirelessly. The external device may include a plurality of remote devices 200. The portable apparatus 100 refers to an apparatus which has the touch screen 191 and transmits and receives data through the sub communicator 130, and includes one or more touch screens. Also, the portable apparatus 100 may include an apparatus capable of transmitting and receiving data to and from another connectable external device by interaction with the touch screen of the portable apparatus, for example, a touch or a touch gesture.

As shown in FIG. 6, the portable apparatus 100 includes the touch screen 191 as the display 190, and a touch screen controller 195. The portable apparatus 100 includes a controller 110, a mobile communicator 120, a sub communicator 130, an image processor 140, an image sensor 150, a global positioning system (GPS) device 155, an input/output device 160, a sensor 170, a storage 175 and a power supply 180.

The sub communicator 130 includes at least one of a wireless local area network (WLAN) device 131 and a short-range communication device 132, and the image processor 140 includes a broadcasting communication device 141, an audio reproducing device 142 and a moving image reproducing device 143. The image sensor 150 includes at least one of a first camera 151 and a second camera 152. The input/output device 160 includes at least one of a button 161, a microphone 162, a loud speaker 163, a vibration motor 164, a connector 165, a keypad 166 and an input device 167. The sensor 170 includes a proximity sensor 171, an illumination sensor 172 and a gyro sensor 173.

The controller 110 may include an application processor (AP) 111, a read only memory (ROM) 112 in which a control program for controlling the portable apparatus 100 is stored, and a random access memory (RAM) 113 which stores a signal or data received from an external device, or may be used as a storage area for various operations performed in the portable apparatus 100.

The controller 110 controls general operations of the portable apparatus 100 and signal flows among internal elements 120 to 195 of the portable apparatus 100, and processes data. The controller 110 controls power supplied from the power supply 180 to the internal elements 120 to 195. Also, if a stored condition is satisfied through a user's input or setting, the controller 110 may execute the OS and various applications stored in the storage 175.

According to an exemplary embodiment, the controller 110 includes the AP 111, the ROM 112 and the RAM 113. The AP 111 may include a graphic processing unit (GPU, not shown) for graphic processing. In the AP 111, a core, (not shown) and the GPU (not shown) may be achieved in the form of system on chip (SoC). The AP 111 may include a single core, a dual core, a triple core, a quad core, and its multiple core. Also, the AP 111, the ROM 112 and the RAM 113 may be connected to each other through an internal bus.

The controller 110 may control the mobile communicator 130, the sub communicator 130, the image processor 140, the image sensor 150, the GPS device 155, the input/output device 160, the sensor 170, the storage 175, the power supply 180, the touch screen 191 and the touch screen controller 195.

The mobile communicator 120 may use one or more antennas (not shown) to connect with the external device including the remote device 200 through a mobile communication under control of the controller 110. The mobile communicator 130 performs voice communication, visual communication, a short message service (SMS), a multimedia messaging service (MMS), and data communication based on transmission of a wireless signal with respect to a mobile phone, a smart phone, a tablet PC or another portable apparatus having a phone number to connect with the portable apparatus 100.

The sub communicator 130 may include at least one of the WLAN device 131 and the short-range communication device 132. For example, the sub communicator 130 may include only the WLAN device 131, or only the short-range communication device 132, or both the WLAN device 131 and short-range communication device 132.

Under control of the controller 110, the WLAN device 131 may be wirelessly connected to an access point (AP) in a place where the access point is installed. The WLAN device 131 supports WLAN standards of IEEE 802.11x from the Institute of Electrical and Electronics Engineers (IEEE). Also, the short-range communication device 132 can wirelessly perform the short-range communication between the portable apparatus 100 and the external device including the remote device 200 without the access point under control of the controller 110. The short-range communication may include Bluetooth, Bluetooth low energy, infrared data association (IrDA), Wi-Fi, ultra wideband (UWB), near field communication (NFC), etc.

The portable apparatus 100 may include at least one of the mobile communicator 120, the WLAN device 131, and the short-range communication device 132 in accordance with its performance. For example, the portable apparatus 100 may include combination of the mobile communicator 120, the WLAN device 131, and the short-range communication device 132 in accordance with its performance.

According to an exemplary embodiment, the mobile communicator 120 or the sub communicator 130 may be connected to the remote device 200, i.e., another portable apparatus 202 such as a student portable apparatus or an electronic board 201 under control of the controller 110, thereby transmitting/receiving a control signal. Such an operation of transmitting/receiving data causes the contents to be shared.

In this exemplary embodiment, the term "communicator" may refer to either of the mobile communicator 120 or the sub communicator 130, or both the mobile communicator 120 and the sub communicator 130.

The image processor 140 may include the broadcasting communication device 141, the audio reproducing device 142 or the moving image reproducing device 143. Under control of the first controller, the broadcasting communication device 141 may receive a broadcasting signal transmitted from an external broadcasting station through a broadcasting communication antenna (not shown), for example, a TV broadcasting signal, a radio broadcasting signal, a data broadcasting signal and broadcasting additional information such as an electric program guide (EPS) or an electric service guide (ESG). Also, the controller 110 may use a video codec device and an audio codec device to process the received broadcasting signal and the broadcasting additional information to be reproduced in the display 190 and the loud speaker 163a and 163b (FIG. 4).

The audio reproducing device 142 may process an audio source previously stored in the storage 175 of the portable apparatus 100 or received from an external source, for example, an audio file having a file extension such as mp3, wma, ogg or way to be reproduced in the loud speaker 163a and 163b under control of the controller 110.

According to an exemplary embodiment, the audio reproducing device 142 may use an audio codec device to reproduce an aural feedback corresponding to a touch or a continuous motion of the touch detected on the touch screen 191, for example, an output of an audio source stored in the storage 175 under control of the controller 110.

The moving image reproducing device 143 may use a video codec device to reproduce a digital moving image source previously stored in the storage 175 of the portable apparatus 100 or received from the exterior, for example, a file having a file extension such as mpeg, mpg, mp4, avi, mov or mkv under control of the controller 110. Most of applications installable in the portable apparatus 100 may reproduce an audio source or a moving image file through the audio codec device or the video codec device.

According to an exemplary embodiment, the moving image reproducing device 143 may use the video codec device to reproduce a visual feedback corresponding to a touch or a continuous motion of the touch detected on the touch screen 191, for example, an output of a moving image source stored in the first storage 175, under control of the controller 110.

It will be easily understood by a person having an ordinary skill in the art that many kinds of video and audio codec devices are produced and sold.

The image processor 140 may include the audio reproducing device 142 and the moving image reproducing device 143 except the broadcasting communication device 141 in accordance with the performance and structure of the portable apparatus 100. Also, the audio reproducing device 142 or the moving image reproducing device 143 of the image processor 140 may be included in the controller 110. In this exemplary embodiment, the term "video codec device" may refer to one or at least two video codec devices.

Likewise, in this exemplary embodiment, the term "video codec device" may refer to one or at least two video codec devices.

The image sensor 150 may include at least one of the first camera (see 151 of FIG. 4), provided on the front side (see 100a of FIG. 4), and the second camera (refer to 152 of FIG. 5), provided on the rear side (see 100c of FIG. 5), to photograph a still image or a moving image under control of the controller 100. The image sensor 150 may include one or both of the first camera 151 and the second camera 152. Also, the first camera 151 or the second camera 152 may further include an auxiliary light source, for example, a flash 153 for providing the quantity of light needed for photographing the image.

Under control of the controller 110, the first camera 151 of the front side 100a may be provided adjacent to an additional camera placed in the front side, for example, a third camera (not shown) (for example, having a distance longer than 2 cm but shorter than 8 cm from the first camera 151 of the front side 100a) so that the first camera 151 and the additional camera (not shown) can photograph a three-dimensional (3D) still image or a 3D moving image. Likewise, the second camera 152 of the rear side 100c may be provided adjacent to an additional camera placed in a rear side, for example, a fourth camera (not shown) (for example, having a distance longer than 2 cm but shorter than 8 cm from the second camera 152 of the rear side 100c) so that the second camera 152 and the additional camera (not shown) can photograph a 3D still image or a 3D moving image. Also, the second camera 152 may use separate adapters (not shown) to take wide angle, telephotographed and close-up pictures.

In this exemplary embodiment, the portable apparatus 100 is being mounted to the cradle 300, receives an input image corresponding to a real document targeted for photographing through the second camera 152 of the rear side 100c, and transmits a content corresponding to the received input image to at least one remote device 200, so that the corresponding content can be shared between the portable apparatus 100 and the remote device 200.

The GPS device 155 periodically receives information from a plurality of Earth-orbiting GPS satellites (not shown), for example, information about correct location and time of the GPS satellite receivable in the portable apparatus 100. The portable apparatus 100 uses the information received from the plurality of GPS satellites to determine the location, speed or time of the portable apparatus 100.

The input/output device 160 may include at least one among one or at least two buttons 161, the microphone 162, the loud speaker 163, the vibration motor 164, the connector 165, the keypad 166 and the input device 167.

Referring to the portable apparatus 100 shown in FIGS. 4 to 6, the button 161 includes a menu button 161b, a home button 161a, and a back button, 161c placed in a lower portion of the front side 100a. The button 161 may include the power/lock button 161d provided at the lateral side 100b and at least one volume control button 161e. However, in the portable apparatus 100, the button 161 may include only the home button 161a. Also, in the portable apparatus 100, the button 161 may be achieved, not by not a physical button, but by a touch button provided outside the touch screen 191. Further, in the portable apparatus 100, the button 161 may be displayed in a text or icon form within the touch screen 191.

According to an exemplary embodiment, the input/output device 160 of the portable apparatus 100 may receive an interaction with content displayed on the touch screen 191, i.e., a user's input based on a touch or a touch gesture.

The microphone 162 receives voice or sound from an exterior source and generates an electric signal under control of the controller 110. The electric signal generated in the microphone 162 is converted by the audio codec device and stored in the storage 175 or output to the loud speaker 163. Here, one or at least two microphones 162 may be provided on the front side 100a, the lateral side 100b and the rear side 100c of the portable apparatus 100. Also, the microphone 162 may be achieved by one or at least two microphones provided in only the lateral side 100b of the portable apparatus 100.

The loud speaker 163 may output a sound corresponding to various signals from the mobile communicator 120, the sub communicator 130, the image processor 140 or the image sensor 150 through the audio codec device, for example, a wireless signal, a broadcasting signal, an audio source, a moving image file or photographing, to the portable apparatus 100 under control of the controller 110.

The loud speaker 163 may output a sound corresponding to a function performed by the portable apparatus 100, for example, a touch control sound corresponding to a phone-number input, or a photographing button control sound. At least one loud speaker 163 may be placed in the front side 100a, the lateral side 100b and the rear side 100c of the portable apparatus 100. Referring to the portable apparatus 100 shown in FIGS. 4 and 5, the plurality of loud speakers 163a 163b are provided in the front side 100a of the portable apparatus 100. Also, the loud speakers 163a and 163b may be placed in the front side 100a and the rear side 100c of the portable apparatus 100, respectively. Also, one loud speaker 163a may be placed in the front side 100a of the portable apparatus 100, and the second loud speakers 163b may be placed in the rear side 100c (for reference, one loud speaker is not illustrated).

Also, one or at least two loud speakers (not shown) may be placed in the lateral side 100b. The portable apparatus 100 where at least one loud speaker (not shown) can be placed in the lateral side 100b may give a different sound effect to a user as compared with the portable apparatus (not shown) where no loud speaker is placed in the lateral side 100b but the loud speakers are placed in the front side 100a and the rear side 100c for illustrative purposes.

According to an exemplary embodiment, the loud speaker 163 may output an aural feedback corresponding to a touch or a continuous motion of the touch detected on the touch screen 191 under control of the controller 110.

The vibration motor 164 may convert an electric signal into a mechanical vibration under control of the controller 110. For example, the vibration motor 164 may include a linear vibration motor, a bar-type vibration motor, a coin-type vibration motor or a piezoelectric vibration motor. If receiving a request for a voice call from the portable apparatus, the vibration motor 164 of the portable apparatus 100 operating in a vibration mode operates under control of the controller 110. One or at least two vibration motors 164 may be placed in the portable apparatus 100. Also, the vibration motor 164 may make the entire portable apparatus 100 vibrate, or may only make a part of the portable apparatus 100 vibrate.

The connector 165 may be used as an interface for connecting the portable apparatus 100 and the external device (not shown) or a power source (not shown). Under control of the controller 110, the portable apparatus 100 may transmit data stored in the storage 175 to the external device or receive data from the external device through a cable connected to the connector 165. The portable apparatus 100 may be supplied with or charge a battery (not shown) with power from the power source through the cable connected to the connector 165. Also, the portable apparatus 100 may connect with an external accessory, for example, a keyboard dock (not shown) through the connector 165.

The keypad 166 may receive a user's key input for controlling the portable apparatus 100. The keypad 166 may include a physical keypad (not shown) formed in the front side 100a of the portable apparatus 100, a virtual keypad (not shown) displayed within the touch screen 191 and a physical keypad (not shown) connected wirelessly. It will be easily appreciated by a person having an ordinary skill in the art that the physical keypad formed in the front side 100a of the portable apparatus 100 may be excluded in accordance with the performance or structure.

The input device 167 may select or touch an object displayed on a screen, e.g., a menu, a text, an image, a moving image, a figure, an icon and a shortcut icon, displayed on the touch screen 191 of the portable apparatus 100. The input device 167 may touch or select a content corresponding to an input image as the object displayed on the touch screen 191 of the portable apparatus 100. Here, the touch screen 191 may display the content corresponding to the input image received through the image sensor 150.

For example, the input device 167 may input a character or the like through a virtual keyboard or by touching an electrostatic capacitive, resistive, or electromagnetic induction type touch screen. For example, the input device 167 may include a pointing device, a stylus, a haptic pen where a built-in pen vibrating element, e.g., a vibration motor or an actuator vibrates in accordance with control information received from the communication device 130 of the portable apparatus 100. Also, the vibrating element may vibrate in accordance with, not the control information received from the portable apparatus 100, but in accordance with sensing information sensed by a built-in sensor of the input device 167 (e.g., an acceleration sensor (not shown)). It will be appreciated by a person having an ordinary skill in the art that the input device 167, which may be inserted into the insertion hole of the portable apparatus 100, may be excluded in accordance with the performance or structure of the portable apparatus 100.

The sensor 170 includes at least one sensor for detecting the status of the portable apparatus 100. For example, the sensor 170 may include the proximity sensor 171 placed in an upper portion of the front side 100a of a user's portable apparatus 100 and which detects the proximity of an object to the portable apparatus 100; the illumination sensor 172 for sensing the quantity of light around the portable apparatus 100; the gyro sensor 173 for sensing a direction of the portable apparatus 100 based on rotational inertia of the portable apparatus 100; the acceleration sensor (not shown) detecting gradients of three axes applied to the portable apparatus 100, for example, the axes of x, y and z; a gravity sensor for detecting the direction of gravity; and an altimeter for detecting an altitude by measuring atmospheric pressure.

The sensor 170 measures acceleration to which acceleration of the portable apparatus and the acceleration of gravity are added, and measures only the acceleration of gravity if the portable apparatus 170 is not moved. For example, if the front side of the portable apparatus 100 is oriented upward, the acceleration of gravity has a positive direction. On the other hand, if the rear side of the portable apparatus 100 is oriented upward, the acceleration of gravity has a negative direction.

At least one sensor included in the sensor 170 may detect the status of the portable apparatus 100, generates a signal corresponding to the detected status and transmits the signal to the controller 110. It will be appreciated by a person having an ordinary skill in the art that the sensor of the sensor 170 may be added or removed in accordance with the performance of the portable apparatus 100.

The storage 175 may store a signal or data input/output corresponding to the operations of the mobile communicator 130, the sub communicator 130, the image processor 140, the image sensor 150, the GPS device 155, the input/output device 160, the sensor 170, and the touch screen 191 under control of the controller 110. The storage 175 may store a graphic user interface (GUI) related to a control program for controlling the portable apparatus 100 and provided or downloaded from an exterior source, images for providing the GUI, user information, a document, a database or the related data.

According to an exemplary embodiment, the storage 175 may store a content corresponding to an input image recognized by the image sensor 150. The stored content may be transmitted to at least one remote device 200 and shared between the devices.

Also, the previously stored content may be edited or processed in response to a user's control using the input/output device 160, and the content modified by edition and process may be streamed and shared as being transmitted in real time to the remote device 200.

If a predetermined application, for example, an educational application is executed in the portable apparatus 100, the controller 110 activates the image sensor 150 and receives an input image acquired by photographing a real document from the exterior, and controls the display 190 including the touch screen 191 to display a content corresponding to the received input image. The input image may be stored in the storage 160.

While the display 190 displays the content corresponding to the input image, the controller 110 controls the communicators 120 and 130 to share the content corresponding to the input image if sensing a user's input on the touch screen 191.

The storage 175 stores touch information corresponding to a touch and/or a continuous motion of the touch (for example, x and y coordinates of the detected touch position, touch detection time, etc.) or hovering information corresponding to hovering (for example, x, y and z coordinates of hovering, hovering time, etc.). The storage 175 may store even the kind of continuous motions of the touch (for example, flick, drag, or drag & drop), and the controller 110 compares the inputted user touch with the information of the storage 175, and determines the kind of touch. The storage 175 may further store a visual feedback output to the touch screen and recognizable by a user in response to the input touch or touch gesture (for example, a video source or the like), an aural feedback output from the loud speaker 163 and recognizable by a user (for example, a sound source or the like), and a tactile feedback output from the vibration motor 164 and recognizable by a user (for example, a haptic pattern or the like).

In this exemplary embodiment, the term "storage" refers to the storage 175, the ROM 112 and the RAM 113 provided in the controller 110, or a memory card (not shown, e.g., a micro SD card, a memory stick, etc.) mounted to the portable apparatus 100. The first storage may include a nonvolatile memory, a volatile memory, a hard disk drive (HDD), or a solid state drive (SSD).

The power supply 180 supplies one or at least two batteries (not shown) placed in the portable apparatus 100, under control of the controller 110. One or at least two batteries are provided between the touch screen placed in the front side 100a and the rear side 100c. Also, the power supply 180 receives power from the external power source (not shown) through the cable connected to the connector 165 and supplies the power to the portable apparatus 100 under control of the controller 110.

The display 190 displays an image corresponding to a video signal processed by the image processor 140. The display 190 in this exemplary embodiment may display a content corresponding to the input image received through the image sensor 150.

The display 190 may be variously achieved without limitation. For example, the display 190 may be achieved by various types such as liquid crystal, plasma, light-emitting diode, organic light-emitting diode, surface-conduction electron-emitter, carbon nano-tube, nano-crystal, etc.

The touch screen 191 may provide a user with the GUIs corresponding to various services, for example, a call, data transmission, broadcasting, photographing, moving image, or applications. The touch screen 191 transmits an analog signal corresponding to a single touch or multi touches input through the GUI to the touch screen controller 195. The touch screen 191 may receive the single touch or the multi touches through the input device 167 to be touched with a user's body, for example, a thumb and fingers.

According to an exemplary embodiment, the touch is not limited to contact between the touch screen 191 and a user's body or the input device 167, which may be used as a touching device. The touch may for example include non-contact (for example, hovering of which a detectable distance between the touch screen 191 and a user's body or between the touch screen 191 and the input device 167 is equal to or less than 30 mm). It will be easily understood by a person having an ordinary skill in the art that the detectable distance for the noncontact in the touch screen 191 may be varied depending on the performance and structure of the portable apparatus 100.

The touch screen 191 may be for example achieved by a resistive type, an electrostatic capacitive type, an infrared type, or an acoustic wave type, but is not limited thereto.

The touch screen controller 195 converts an analog signal corresponding to a single touch or multi touches received from the touch screen 191 into a digital signal (for example, X and Y coordinates corresponding to the detected touch position) and transmits the digital signal to the controller 110. The controller 110 may calculate X and Y coordinates corresponding to the touch position on the touch screen 191, based on the digital signal received from the touch screen controller 195. Also, the controller 110 may control the touch screen 191 based on the digital signal received from the touch screen controller 195. For example, the controller 110 may display the shortcut icon (see 193e of FIG. 4) displayed on the touch screen 190 and selected in response to the input touch to be distinguished from another shortcut icon (e.g., 193a to 193d), or execute an application (e.g., an educational application) corresponding to the selected shortcut icon 193e to be displayed on the touch screen 190.

According to an exemplary embodiment, one or a plurality of touch screen controllers 195 may control one or a plurality of touch screens 190. In accordance with the performance or structure of the portable apparatus 100, the touch screen controller 195 may be included in the controller 110.

A user's touch includes drag, flick, drag & drop, tap, long tap, double tap, etc.

The drag refers to an operation where a user touches a position on a screen with his/her finger or the input device 167 and moves his/her finger or the input device to another position within the screen while maintaining the touch on the screen. The drag may cause a selected object to move. Also, if the screen is touched and dragged without selecting an object within the screen, the screen may be moved by the drag or another screen may be displayed.

The flick refers to an operation where a user performs the drag at a critical or higher speed (e.g., 100 pixel/s) with his/her finger or the input device 167. Here, the drag and the flick are distinguished by comparing the moving speed of the finger or the input device and the critical speed (e.g., 100 pixel/s).

The drag & drop refers to an operation where a user drags a selected object to another position within the screen with his/her finger or the input device 167 and then drops or releases it. The drag & drop causes the selected object to move to a different position.

The tap refers to an operation where a user touches and releases the screen quickly with his/her finger or the input device 167. In other words, the tap refers to a case where a difference in time between a point of time when the finger or the input device 167 touches the screen and a point of time when the finger or the input device 167 is taken off the screen is very short.

The long tap (hereinafter, also referred to as 'long press') refers to an operation where a user touches the screen with his/her finger or the input device 167 for a predetermined period of time or more. In the long tap, a difference in time between a point of time when the finger or the input device 167 touches the screen and a point of time when the finger or the input device 167 is taken off the screen is longer than that of the tap. Thus, the tap and the long tap are distinguished as the controller 100 compares a preset reference time with the difference between a touching time and a releasing time.

The double tap refers to an operation where a user successively touches the screen two or more times with his/her finger or the input device 167.

According to the exemplary embodiment, the drag, the flick, the drag & drop and similar user touches which have a continuous motion in a predetermined direction will be called a swipe input.

The foregoing user's touches, that is, the drag, the flick, the drag & drop, the tap, the long tap and the double tap are applied to the portable apparatus or the remote device 200 achieved by the display apparatus. Under control of the touch screen controller (not shown) or the controller (not shown) provided in the remote device 200, a user's touch on the touch screen (not shown) of the display (not shown) is sensed; the kind of sensed touch input is determined; and information about the coordinates corresponding to the touched position is calculated and the calculated coordinate information is transmitted to the image processor (not shown).

The controller 110 senses a control position corresponding to a user's touch on the touch screen 191 of the display 190, sets up a virtual point (X and Y coordinates) corresponding to the sensed control position, and edits the contents in the setup object area set up by the virtual point. Here, the edition includes at least one among position change, size adjustment, rotation, copy and cutting of the content corresponding to the object area.

Further, the controller 110 controls the operations of the touch screen 191 and the communicator 120 or 130 in response to the editing of the contents. For example, if a user's touch corresponds to zoom in/out control using the multi touches, the controller 110 may control the display 190 to display the object area to be zoomed in or out. Also, if a user's touch has a continuous motion in a predetermined direction like the flick and the drag, the controller 110 may control the display 190 to move and display the object area in response to the motion direction of the user's touch.

The controller 110 of the portable apparatus 100 according to an exemplary embodiment senses a user's control position with regard to an input target received through the image sensor 150 (e.g., photographed by the camera), sets up the virtual point (X and Y coordinates) corresponding to the sensed control position, and edits the content of the object area set up by the virtual point. Here, the editing may include at least one among position change, size adjustment, rotation, copy and cut of the content corresponding to the object area. Further, the controller 110 controls the operations of the communicator 120 or 130 and the touch screen 191 displaying a content corresponding to the input image in response to the editing of the content.

The controller 110 can calculate X and Y coordinates corresponding to the touch position on the touch screen 191 in accordance with the virtual point corresponding to the control position of the input target of the image sensor 150. Also, the controller 110 controls the touch screen 191 based on the calculated X and Y coordinates.

At least one element may be added to or removed from the elements of the portable apparatus 100 shown in FIG. 6 in accordance with the performance of the portable apparatus 100. Also, it will be easily understood by a person having an ordinary skill in the art that the positions of the elements may be changed in accordance with the performance and structure of the portable apparatus 100.

Below, the interaction for sharing the contents of the portable apparatus 100 with the remote device 200 will be described in more detail.

FIGS. 7 to 15 show examples of content sharing interaction in the portable apparatus 100 according to an exemplary embodiment.

Figure 7:
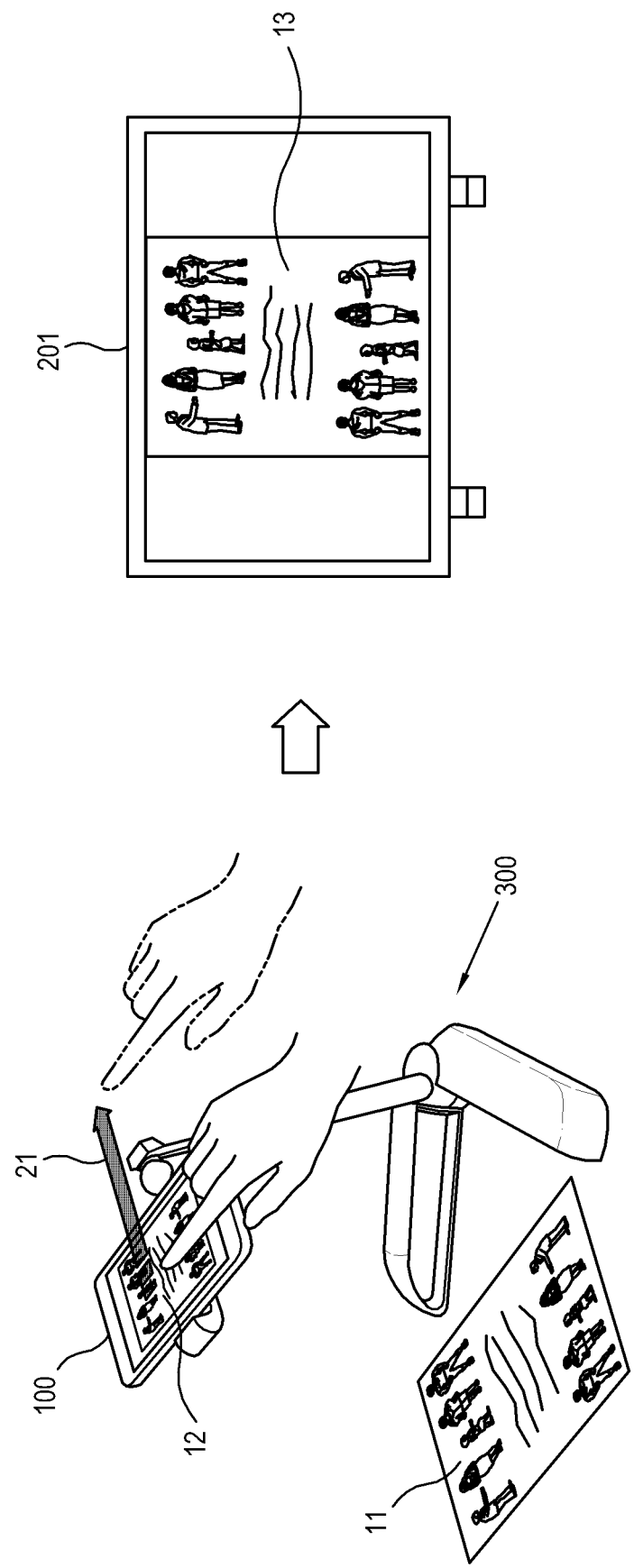

As shown in FIG. 7, if the image sensor 150 is activated while the portable apparatus 100 is mounted to the cradle 300, an input image acquired by photographing a document, i.e., an input target 11 (hereinafter, also referred to as a photographing target) through the image sensor 150 is received in the portable apparatus 100.

The controller 110 controls the touch screen 191, i.e., the display 190 to display a content 21 corresponding to the input image received through the image sensor 150.

The portable apparatus 100 may receive a swipe input 21 having a continuous motion in a predetermined direction as a user input on the touch screen 191 as shown in FIG. 7. The controller 110 controls the communicator 120 or 130 to transmit the content 12 corresponding to the input image to at least one remote device 201 in response to the swipe input 21. Here, if the portable apparatus 100 and the remote device 201 are connected by a 1:1 correspondence, the content 12 is transmitted to one remote device 201.

The corresponding content 12 is received through the communicator (not shown) of the remote device 201, and displayed as an image 13 on the display of the remote device 201 as shown in FIG. 7. Thus, the content corresponding to the input image is shared between the portable apparatus 100 and the remote device 201.

Here, the portable apparatus 100 and the remote device 201 may share the content to be streamed in real time. That is, if a user's interaction with the touch screen 191 or a real document targeted by the image sensor 150 to be photographed is detected in the portable apparatus 100, the content 12 displayed on the display 190 of the portable apparatus 100 is correspondingly changed, and the change in the content is synchronized and reflected on the display of the remote device 201 sharing the corresponding content in real time. Thus, the content 13 is changed and displayed in even the display of the remote device 201.

FIG. 7 shows an example where the remote device 201 receiving the content 12 is achieved by the display apparatus such as an electronic board (IWB). In this exemplary embodiment, the remote device that receives the content 12 of the input image in accordance with the swipe input 21 may be achieved by the portable apparatus such as a tablet PC, a smart phone, etc.

As shown in FIG. 7, the display apparatus 201 includes the display for displaying the content 13 corresponding to a received image, i.e., the input image of the portable apparatus 100, and may further include an input device (not shown), e.g., a pointing device, as an input device for touching a predetermined position on the display.

The display apparatus 201 may be achieved by a TV or a monitor for a computer, which has the display, but is not limited thereto. In this exemplary embodiment, the display apparatus 201 is for instance achieved by an electronic board (IWB) to which the display including a plurality of display panels (not shown) is applied to get a large-sized screen. The plurality of display panels may be arranged in parallel with each other along a wall or in the form of matrix standing on the ground.

The display of the display apparatus 201 includes a touch screen to receive an input based on a user's touch. Here, a user's touch includes a touch based on contact of a user's body, e.g., a thumb or fingers or the input device 167. In this exemplary embodiment, the touch screen of the display of the display apparatus 201 may receive a single touch or multi touches. The touch screen may for example be achieved by a resistive type, an electrostatic capacitive type, an infrared type, or an acoustic wave type, but is not limited thereto.

Figure 8:
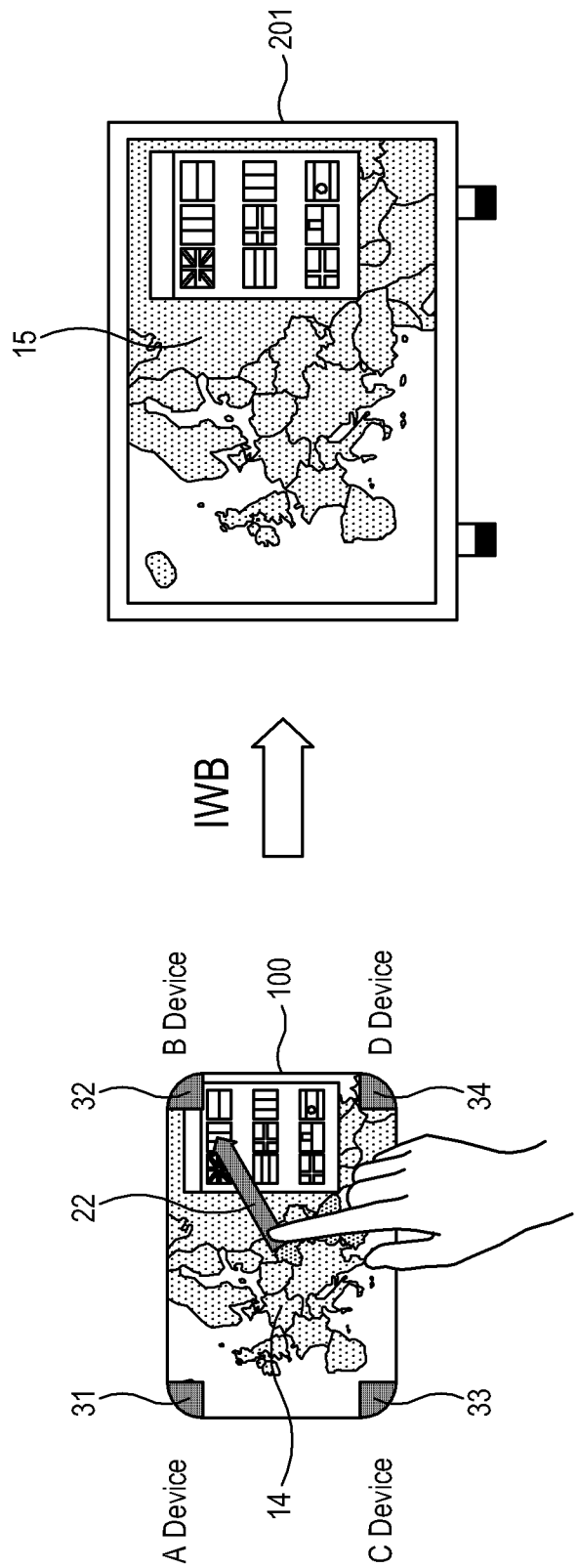

As shown in FIG. 8, the portable apparatus 100 in this exemplary embodiment is connected to the plurality of remote devices 200 by a 1:N correspondence, and transmits and receives a content corresponding to the input image to and from at least one remote device 201 set up corresponding to the motion direction of the swipe input 22, i.e., a user input, among the plurality of remote devices 200.

Specifically, as shown in FIG. 8, the portable apparatus 100 may receive a swipe input 22 having a continuous motion in a predetermined direction, as a user input on the touch screen 191 while a content 14 corresponding to the input image acquired by photographing the input target 11 through the image sensor 150. Here, the received user input 22 may have directionality in one of directions toward edge areas 31, 32, 33 and 34 set up as a virtual cue on the screen of the touch screen 191, for example, directionality toward a right upper portion 32.

The controller 110 controls the communicator 120 or 130 to transmit a content 14 corresponding to the input image to at least one remote device set up corresponding to the motion direction of the user input 22 among the plurality of remote devices (devices A to D), for example, to the device B 201 in response to the swipe input 22. For example, if the remote device 201 corresponds to the edge area 32, the user will initiate a swipe input 22 in the direction of the edge area 32 in order to transmit a content to the remote device 201. The remote devices respectively corresponding to the edge directions 31, 32, 33 and 34 of the touch screen 191 are previously set up and stored in the storage 175. For example, as shown in FIG. 8, the upper left portion is set up to correspond to the device A (e.g., a smart phone), the upper right portion is set up to correspond to the device B (e.g., an IWB), the lower left portion is set up to correspond to the device C (e.g., a tablet PC), and the lower right portion is set up to correspond to the device D (e.g., a PC).

When the swipe input 22 toward a predetermined edge is sensed on the touch screen 191, the controller 101 determines the remote device set up to correspond to the corresponding edge direction, for example, the device B (e.g., an IWB), and controls the communicator 120 or 130 to transmit the content 14 to the corresponding remote device 201.

The corresponding content 14 is received through the communicator (not shown) of the remote device 201, and displayed as an image 15 on the display of the remote device 201 as shown in FIG. 8. Thus, the content corresponding to the image is shared between the portable apparatus 100 and the remote device 201 corresponding to a direction of a user's input, in which the portable apparatus 100 and the remote device 201 may share the content to be streamed in real time.

Figure 9:
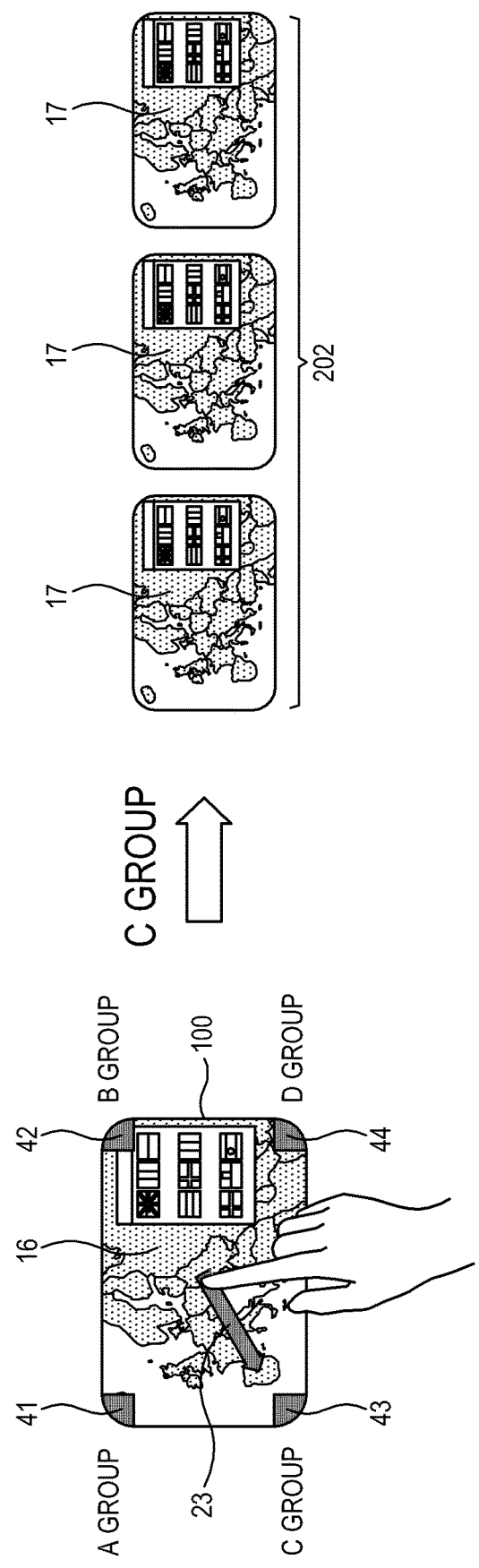

Also, as shown in FIG. 9, the portable apparatus 100 according to an exemplary embodiment may transmit the content corresponding to the input image to the remote device of a user, who belongs to a group set up to correspond to a user's input, i.e., the motion direction of the swipe input 22, among the plurality of remote devices 200.

Specifically, as shown in FIG. 9, the portable apparatus 100 may receive a swipe input 23 having a continuous motion in a certain direction, as a user's input on the touch screen 191, in the state that the content 16 corresponding to the input image acquired by photographing the input target 11 through the image sensor 150 is being displayed. Here, the received user input 23 may have directionality toward one of the edge directions 41, 42, 43 and 44 of the touch screen 191, for example, toward the lower left portion 43.

The controller 110 controls the communicator 120 or 130 to transmit the content 16 corresponding to the input image to the remote device of a user, who belongs to the group set up corresponding to the motion direction of the user input 23, among the plurality of user group (e.g., groups A to D), for example, to the tablet PCs 202 of students 1, 2 and 3 who belong to the group C. Here, the groups respectively corresponding to the edge directions 41, 42, 43 and 44 of the touch screen 191 are previously set up and stored in the storage 175. For example, as shown in FIG. 9, the upper left portion is set up to correspond to the group A, the upper right portion is set up to correspond to the group B, the lower left portion is set up to correspond to the students 1, 2 and 3 of the group C, and the lower right portion is set up to correspond to the group D.

If the swipe input 23 toward a predetermined edge is sensed on the touch screen 191, the controller 101 determines a group set up to correspond to the corresponding edge direction, and controls the communicator 120 or 130 to transmit the content 16 to the remote device 202 of users who belong to the determined group.

The corresponding content 16 is received through the communicator (not shown) of the remote device 202, and displayed as an image 17 on the remote devices 202 of the students 1, 2 and 3 who belong to the group C as shown in FIG. 9. Thus, the content corresponding to the input image is shared between the portable apparatus 100 and the remote devices 202 of the group corresponding to the user's input direction, in which the portable apparatus 100 and the remote device 202 share the content to be streamed in real time.

The exemplary embodiments of FIGS. 7 to 9 illustrate that the content photographed by the portable apparatus 100 in response to the swipe input on the touch screen 191 is transmitted to and shared with the remote device 201, but is not limited thereto. Alternatively, according to an exemplary embodiment, the content may be shared among the remote devices 201 and 202 in accordance with a continuous input, i.e., a swipe having directionality with respect to the real document 11 targeted to be photographed. In this case, the image sensor 150 recognizes the directionality of the user interaction with the real document 11 targeted to be photographed, and the controller 110 controls the content of the photographed image to be transmitted to the remote devices 201 and 202 in real time, to be shared among the remote devices 201 and 202.

While sharing the content to be streamed in real time with the remote devices 201 or 202, the portable apparatus 100 in this exemplary embodiment may receive a touch input as a user's interaction with the content 18 displayed on the touch screen 191 of the portable apparatus 100 as shown in FIG. 10.

The controller 110 displays a pointer 24 (FIG. 10) corresponding to the received touch input on the content of the touch screen 191. Further, the controller 110 controls the communicator 120 or 130 to send a command to the remote device 201 so that the content 19 displayed on the remote device 201 which communicates by real time streaming with the portable apparatus 100 can be synchronized with the content 18 of the portable apparatus 100.

The corresponding command is received through the communicator (not shown) of the remote device 201, so that a pointer 25 corresponding to a user's touch input can be displayed on the display of the remote device 201 as shown in FIG. 10. Thus, the portable apparatus 100 and the remote device 201 communicate to share the contents to be streamed in real time, and therefore a teacher can efficiently deliver learning materials to students by a simple method of controlling the touch screen 191 of the portable apparatus 100.

Figure 11:
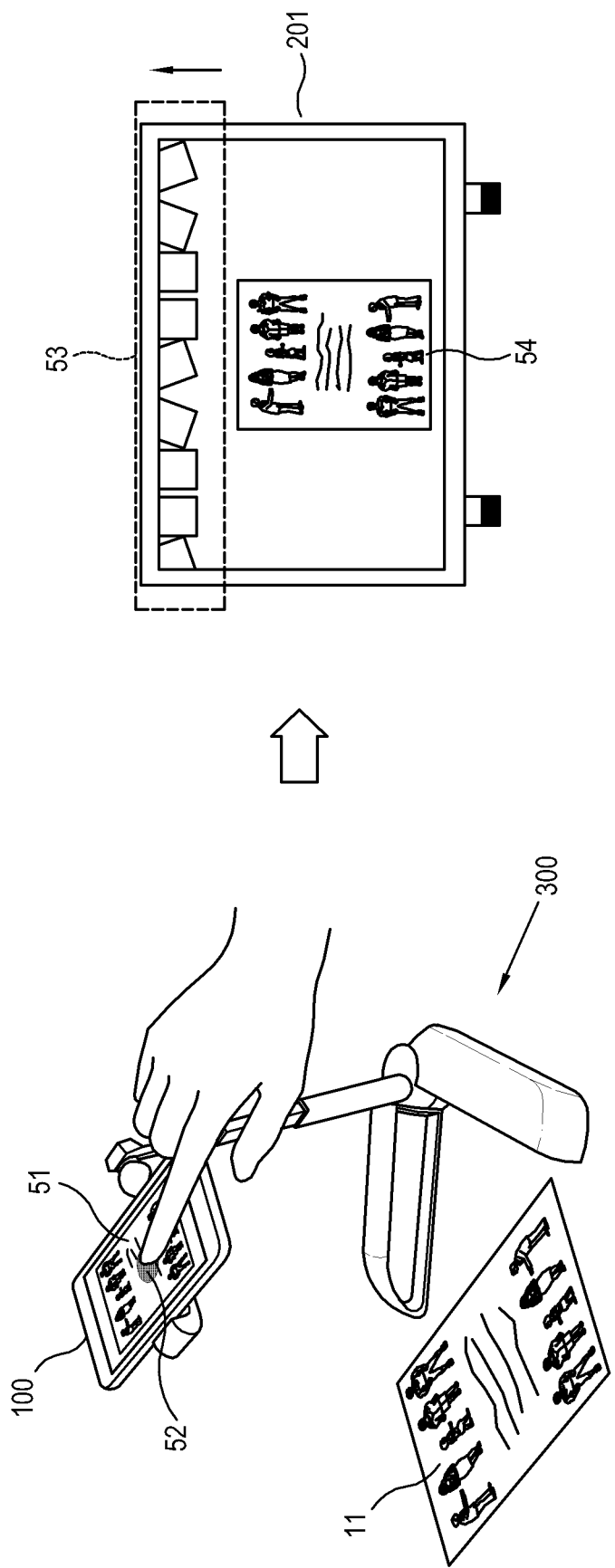

As shown in FIG. 11, the portable apparatus 100 according to an exemplary embodiment captures an image 11 of a target document, displays the captured image on the screen 191, and transmits the captured image to the remote device 201, and stores the image, thereby performing the sharing operation.

As shown in FIG. 11, the touch screen controller 195 of the portable apparatus 100 senses a tap 52 as a user's touch input on the touch screen 191, and transmits it to the controller 110. The controller 110 captures an image from the screen 51 displayed on the touch screen 191 where the tap 52 is sensed, and controls the communicator 120 or 130 to transmit the captured image to the remote device 201. Here, the portable apparatus 100 may receive a user's touch input, i.e., the tap two or more times, and transmit a plurality of capture images to the remote device 201 in response to each tap input.

As shown in FIG. 11, the transmitted captured image is displayed on a preset area of the display of the remote device 201, for example, an upper end portion 53. The preset area 53 displays a list of images including the plurality of captured images.

A user can select one image from the image list of the preset area 53, and the display of the remote device 201 displays the captured image 54 selected by a user. Also, the image list of the preset area 53 may be hidden in one side of the display, e.g., in the upper end through a handler.

Referring to FIGS. 12 to 15, the portable apparatus 100 according to an exemplary embodiment may edit an image, i.e., a content displayed corresponding to a sensed user's interaction with the input target 11 of the image sensor 150 or the touch screen 191, and share the edited content with the remote device 201 and 202. Here, a user's interaction includes a user's hand gesture performed on the document, i.e., the photographing target 11, and the hand gesture is photographed by the camera, i.e., the image sensor 150 used in photographing the document 11.

As shown in FIG. 12, the image sensor 150, that is, the camera 152 recognizes the hand gesture as a user's interaction with the photographing target 11, i.e., the real document, and the controller 110 performs control for an image corresponding to the real document in accordance with the hand gesture recognized through the camera 152.

Specifically, the controller 110 sets up virtual points corresponding to a user's control positions, i.e., finger contact positions 61, 62, 63 and 64 with the real document, i.e., the input target 11 recognized through the camera 152, and sets up the object area 60 based on the virtual points.

FIG. 12 shows an example where the object area 60 is set up based on the virtual four points corresponding to a plurality of, i.e., four control positions with regard to the input target 11. Alternatively, according to an exemplary embodiment, the object area may be set up corresponding to a continuous motion of one virtual point, i.e., by one finger interaction.

Also, FIG. 12 shows a case that a user's control position with regard to the input target 11 is sensed through the image sensor 150 and used to set up the object area 60. Alternatively, according to an exemplary embodiment, a physical characteristic figure, color, etc. as well as a user's control position may be recognized through the image sensor 150 and used to set up the object area.

Figure 13:
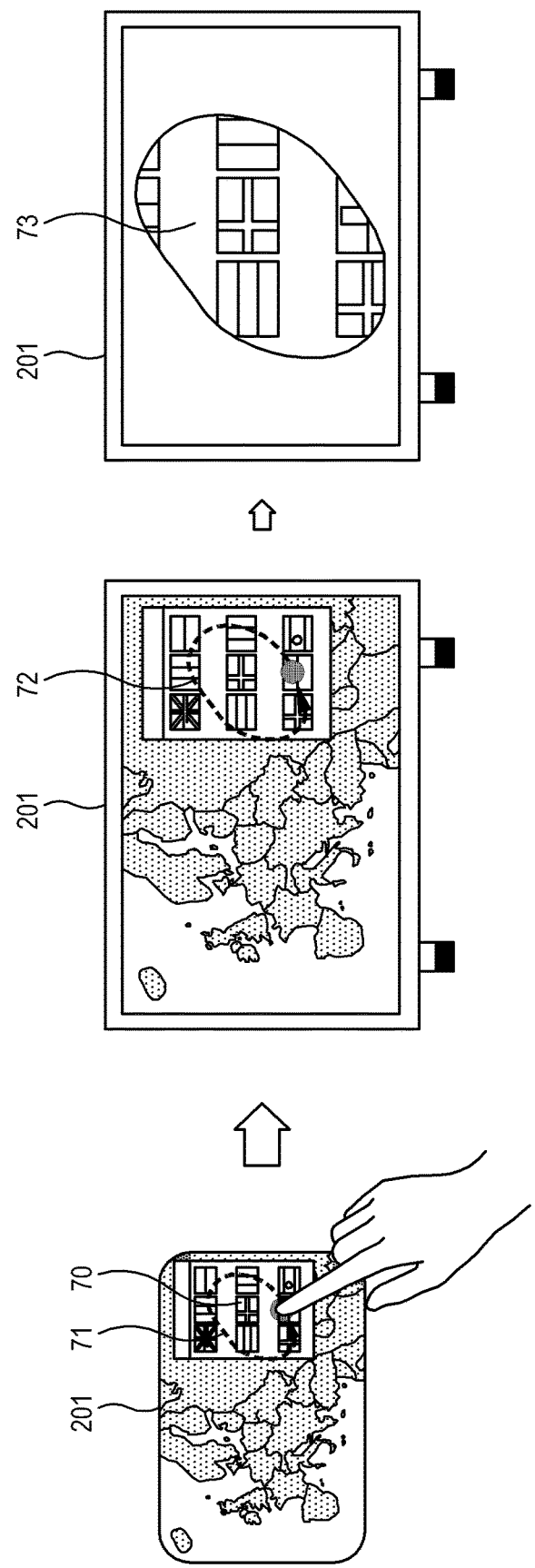

As shown in FIG. 13, the controller 110 of the portable apparatus 100 according to an exemplary embodiment sets up a virtual point corresponding to a user's control position, i.e., a finger contact position 71 with regard to the touch screen 191, and sets up the object area 70 corresponding to the virtual point.

FIG. 13 shows an example where the object area 70 is set up corresponding to a continuous motion of one virtual point 71 with regard to the touch screen 191.

Figure 14:
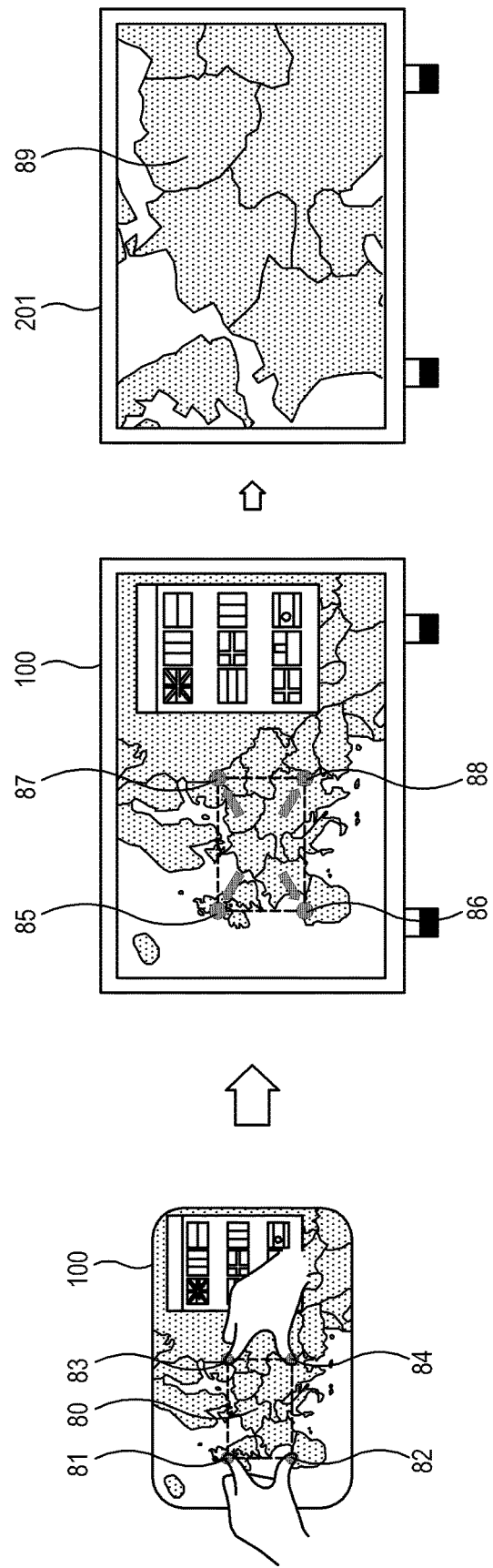

According to an exemplary embodiment, as shown in FIG. 14, an object area 80 may be set up based on a plurality of virtual points corresponding to a plurality of control positions 81, 82, 83 and 84.

As shown in FIGS. 12, 13, and 14, a user can edit the content of the object areas 60, 70, 80 set up based on the virtual points. Here, the editing includes at least one among position change, size adjustment, rotation, copy and cutting of the content corresponding to the object areas 60, 70 and 80. The portable apparatus 100 transmits a command so that the edited content of the object areas 60, 70, 80 can be synchronized with that of the remote device 201 or 202, thereby sharing the content therebetween.

Specifically, referring to FIG. 12, if a rotation or a similar editing for the object area 60 is detected in the portable apparatus 100, a result from the editing is also shared with the remote device 201 so that a content 69 displayed on the display of the remote device 201 is equally edited, i.e., rotated.

Also, as shown in FIG. 13, if the copy, cut or a similar editing for the object area 70 is detected in the portable apparatus 100, a result from the editing is also shared with the remote device 201 so that an edited, i.e., cut content 73 is displayed on the display.

Likewise, as shown in FIG. 14, if size adjustment (zoom in/out) or a similar edit for the object area 80 is detected in the portable apparatus 100, a result from the edit is also shared with the remote device 201 so a content 89 displayed on the display of the remote device 201 is equally edited, i.e., zoomed out and displayed.

In FIGS. 12 to 14, the setup of the object areas 60, 70, 80 and the editing of the corresponding content may be performed by either of the user interaction with the input target 11 of the image sensor 150 or the user interaction with the touch screen 191.

The portable apparatus 100 according to an exemplary embodiment may merge the edited content with a different content, for example, a content shared with the remote device 201 and thus generate a composite content, thereby sharing the composite content to be streamed with the remote device 201.

Figure 15:
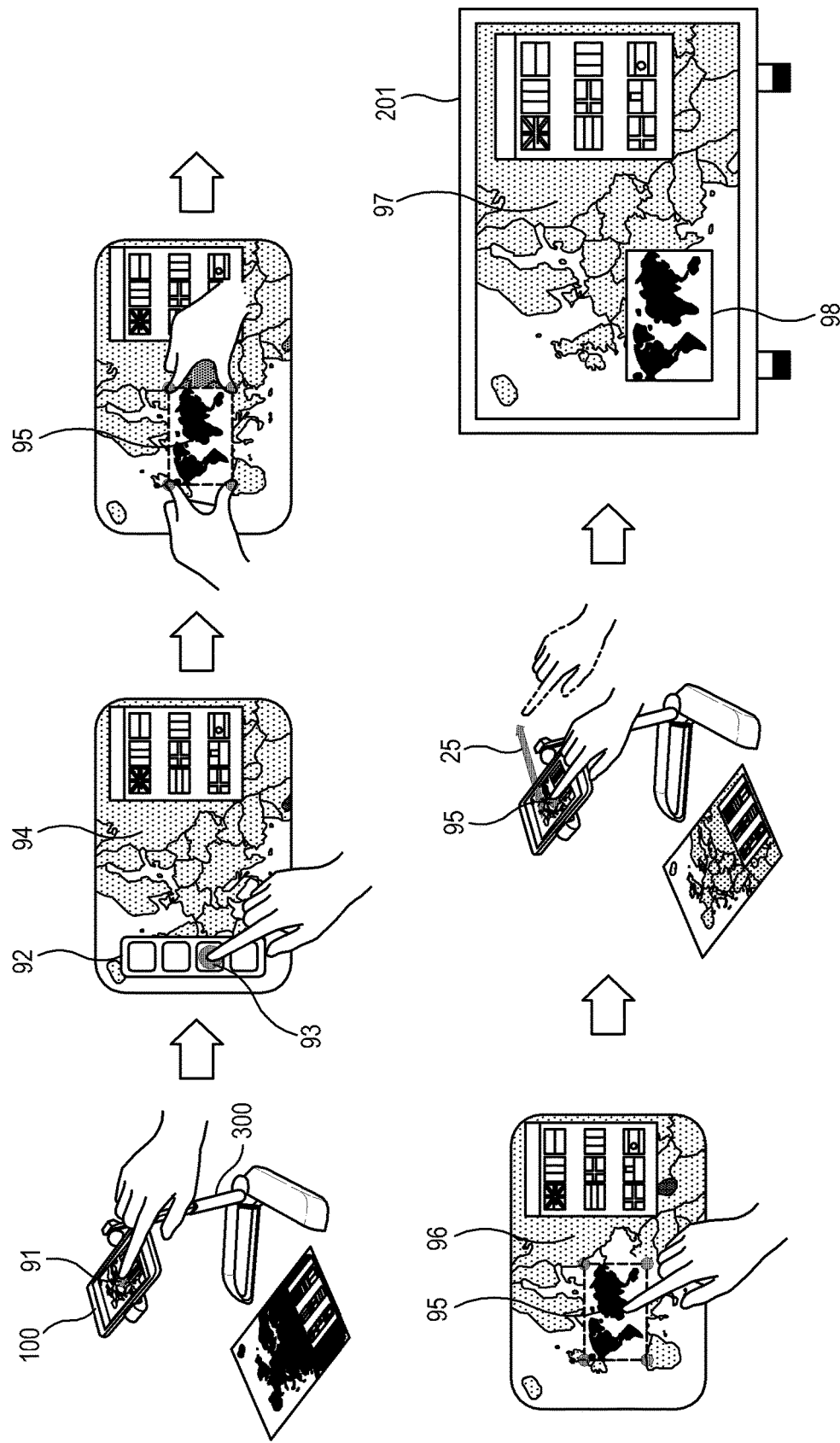

Specifically, as shown in FIG. 15, the portable apparatus 100 may sense a double tap 91 as a user input on the touch screen 191 while a first content 94 corresponding to an input image acquired by photographing the input target 11 through the image sensor 150 is displayed in the portable apparatus 100 and transmitted to and shared with the remote device 201.

The controller 110 may display a menu item 92 as a predetermined user interface UI on the touch screen 191 in response to the sensed double tap 91. A user may select a content file menu 93 from a menu item 92, and select one to be loaded among various contents stored in the storage 175. The controller 110 controls a second content 95 loaded as shown in FIG. 15 to be displayed in a certain area of the touch screen 191.

A user may perform editing with regard to the second content 95 as the user control on the touch screen 191. The controller 110 generates a composite image 96, where the second content 95 is merged with the first content 94, in response to a long press input to the edited second content 95, and controls the touch screen 191 to display the composite image 96.

Further, the portable apparatus 100 may receive a user input having a continuous motion in a predetermined direction, i.e., the swipe input 25 with regard to the touch screen 191 where the composite image 96 is displayed.

The controller 110 controls the communicator 120 or 130 to transmit the composite image 96 to the remote device 201, with which the first content is shared, in response to the swipe input 25.

The transmitted composite image 96 is received through the communicator (not shown) of the remote device 201, and displayed as an image 97 on the display of the remote device 201 as shown in FIG. 15. The displayed composite content 97 includes an edited second content 98.

Here, FIG. 15 illustrates that the remote device 201 synchronizes and displays the composite content 97 in such a way that the portable apparatus 100 generates the composite image 96 and the generated composite image 96 is transmitted to the remote device 201, but is not limited thereto. Alternatively, the synchronization may be performed in such a way that the second content 95 edited in the portable apparatus 100 is transmitted to the remote device 201, and the remote device 201 merges the second content 98 with the previously shared first content to generate the composite image.

Thus, the content can be shared so that the content changed by the editing and/or merging of the content can be streamed in real time without discontinuity between the portable apparatus 100 and the remote device 201.

Below, a method of sharing the content according to an exemplary embodiment will be described with reference to FIGS. 16 and 17.

Figure 16:
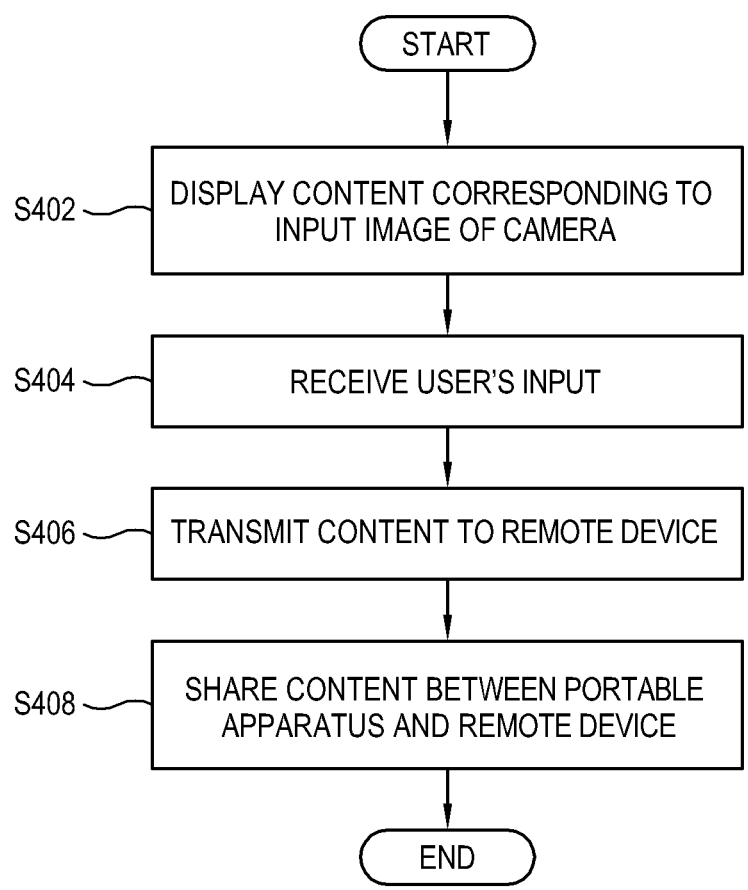
FIGS. 16 and 17 are flowcharts showing a content sharing method of the portable apparatus according to an exemplary embodiment.
Figure 17:
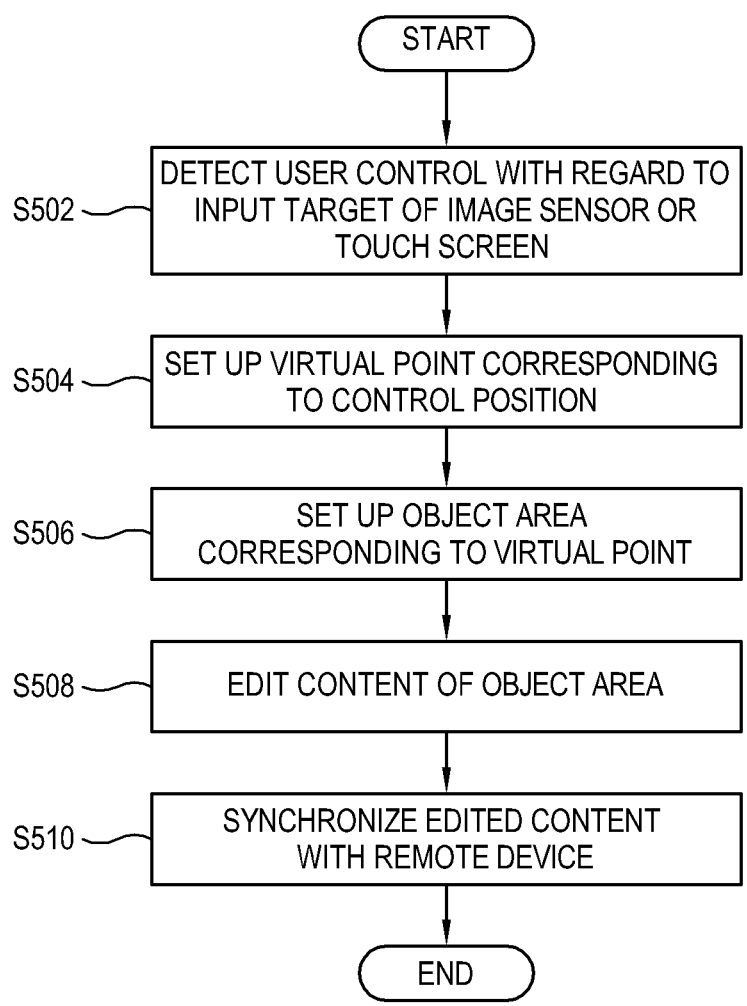

FIGS. 16 and 17 are flowcharts showing a content sharing method of the portable apparatus 100 according to an exemplary embodiment, in which FIG. 16 shows the interaction for sharing the content corresponding to the input image, and FIG. 17 shows the interaction for editing/merging/modifying the shared content of FIG. 16.

As shown in FIG. 16, at operation S402, the portable apparatus 100 may display a content corresponding to the input image of the image sensor 150, i.e., the camera 152 on the touch screen 191. Here, the portable apparatus 100 may be mounted to a portable cradle 300, and receive an input image photographed by the camera 152.

At operation S404, the portable apparatus 100 receives a user's touch input on the touch screen 191 where the content corresponding to the input image is displayed. Here, a user's touch input includes a swipe input having a continuous motion in a predetermined direction. Also, as necessary, the portable apparatus 100 may receive a continuous input in a predetermined direction with respect to a real document targeted for photographing of the image sensor 150.

At operation S406, the controller 110 transmits a content corresponding to the input image received in the operation S402 to at least one remote device 200 in response to the input in the operation S404. Here, if the content is transmitted to the plurality of remote devices 200, the content may be transmitted to at least one remote device or remote devices of users who belong to a group, corresponding to a motion direction of a user's touch input received in the operation S404.

The remote device 200 receives the content transmitted in the operation S406, so that the content can be shared between the portable apparatus 100 and the remote device 200 at operation S408. Here, the sharing of the content includes sharing based on real-time streaming.

As shown in FIG. 17, at operation S502 the portable apparatus 100 may sense a user control with regard to the input target 11 of the image sensor 150 or the touch screen 191 while sharing the content in a manner similar to operation S408 of FIG. 16.

At operation S504, the controller 110 sets up a virtual point corresponding to a control position sensed in the operation S502. Here, a plurality of virtual points or one continuous virtual point may be set up with regard to the user's control in the operation S502.

At operation S506, the controller 110 sets up the object areas 60, 70, 80 corresponding to the virtual point set up in the operation S504. Here, the object areas 60, 70, 80 correspond to an area formed by connecting the plurality of virtual points, or an area formed by one continuous virtual point.

At operation S508, a user may edit the content of the object areas 60, 70, 80 set up in the operation S506. Here, at operation S508 the editing may include at least one among position change, size adjustment, rotation, copy and cut of the content corresponding to the object area 60, 70, 80 set up in the operation s506. Also, the edited content may further include a composite image.

At operation S510, the edited content generated in the operation S508 is synchronized with the remote device 200 in accordance with the real-time streaming in the operation S408 of FIG. 16.

According to an exemplary embodiment, the content of the portable apparatus input through the camera is transmitted to and stream-shared with at least one remote device though a user's simple control, so that the content can be easily edited/merged.

Thus, the portable cradle and the portable apparatus are used in a streaming-interlocked manner with a large format display screen and/or a portable apparatus in accordance with interaction based on an intuitive and simple gesture, thereby sharing learning contents in real time in an educational spot. Accordingly, it is possible to efficiently support education focused on students with low costs, substituting for a visual presenter which have the disadvantages of high prices, complicated setting and difficulty in portability.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A method of sharing contents in a portable apparatus with at least one remote device, the method comprising:
    displaying an image corresponding to a document targeted to be photographed by a camera provided in the portable apparatus, the image being displayed on a touch screen of the portable apparatus;
    receiving an initial touch input with the image and a drag input following the initial touch input on the touch screen, the drag input having a continuous motion in a predetermined direction;
    in response to the initial touch input and the drag input, transmitting information related to a content corresponding to the image to the at least one remote device corresponding to the predetermined direction so that the at least one remote device displays an image corresponding to the content;
    receiving a user interaction comprising a user's hand gesture performed on the document targeted to be photographed by the camera; and
    in response to transmitting of the information, sharing the content corresponding to the image displayed on the touch screen of the portable apparatus with the at least one remote device corresponding to the predetermined direction so that content displayed on a screen of the at least one remote device corresponds to another user's input on the touch screen.

2. The method according to claim 1, wherein the user interaction comprises a continuous motion in a predetermined direction.

3. The method according to claim 1, wherein the sharing the content comprises sharing the content with a first remote device among a plurality of remote devices, wherein the first remote device is set up to correspond to a motion direction of the drag input on the touch screen.

4. The method according to claim 1, further comprising:
    displaying a pointer corresponding to at least one of the user interaction with the document and the user's input on the touch screen of the portable apparatus on a content displayed on the touch screen of the portable apparatus; and
    transmitting a command to the at least one remote device to synchronize a content displayed on a screen of the remote device with the content displayed on the touch screen of the portable apparatus.

5. The method according to claim 1, further comprising:
    sensing a tap on a touch screen of the portable apparatus;
    capturing an image from an image displayed on the touch screen where the tap is sensed; and
    transmitting information related to the captured image to the at least one remote device to be shared with the at least one remote device.

6. The method according to claim 5, wherein an image corresponding to the captured image is displayed on a preset area of a display of the at least one remote device and is selectable by a user of the at least one remote device.

7. The method according to claim 1, wherein the portable apparatus is mounted to a portable cradle comprising a holder which is adjustable in different angles to correspond to an orientation of the camera, and is adjustable in different widths to correspond to a size of the portable apparatus, a support which is adjustable in height, and a base which supports the holder and the support.

8. The method according to claim 1, wherein the at least one remote device comprises at least one of an electronic board and another portable apparatus.

9. A portable apparatus capable of communicating with at least one remote device, the portable apparatus comprising:
    a communicator which is configured to communicate with an external device;
    a camera which is configured to receive a document targeted for photographing as an input image;
    a display which is configured to comprise a touch screen configured to receive a user's touch input; and
    a controller which is configured to control the display to display an image corresponding to the document received by the camera on the touch screen, to sense an initial touch with the image and a drag input following the initial touch input on the touch screen, the drag input having a continuous motion in a predetermined direction, and, in response to the initial touch input and the drag input, control the communicator to transmit information related to a content corresponding to the image to the at least one remote device corresponding to the predetermined direction so that the at least one remote device displays an image corresponding to the content,
    wherein the controller is configured to sense a user interaction comprising a user's hand gesture performed on the document targeted to be photographed by the camera,
    wherein, in response to transmitting of the information, the controller is configured to control the communicator to share the content corresponding to the image displayed on the touch screen of the portable apparatus with the at least one remote device corresponding to the predetermined direction so that content displayed on a screen of the at least one remote device corresponds to another user's input on the touch screen of the portable apparatus.

10. The portable apparatus according to claim 9, wherein the user interaction comprises a continuous motion in a predetermined direction.

11. The portable apparatus according to claim 9, wherein the controller is configured to control the communicator to share the content with a first remote device among a plurality of remote devices, wherein the first remote device is set up to correspond to a motion direction of the drag input on the touch screen.

12. The portable apparatus according to claim 9, wherein the controller is configured to control the display to display a pointer corresponding to at least one of the user interaction with the document and the user's input on the touch screen of the portable apparatus on a content displayed on the touch screen of the portable apparatus, and controls the communicator to transmit a command to the remote device to synchronize a content displayed on a screen of the remote device with a content displayed on the touch screen of the portable apparatus.

13. The portable apparatus according to claim 9, wherein the controller is configured to sense a tap on the touch screen of the portable apparatus, capture an image from a screen displayed on the touch screen of the portable apparatus where the tap is sensed, and control the communicator to transmit information related to the captured image to the at least one remote device to be shared with the at least one remote device.

14. The portable apparatus according to claim 13, wherein an image corresponding the captured image is displayed on a preset area of a display of the at least one remote device and selectable by a user of the at least one remote device.

15. The portable apparatus according to claim 9, wherein the portable apparatus is configured to be mounted to a portable cradle comprising a holder which is adjustable in different angles to correspond to an orientation of the camera and adjustable in different widths to correspond to a size of the portable apparatus, a support which is adjustable in height, and a base which supports the holder and the support.

16. The portable apparatus according to claim 9, wherein the at least one remote device comprises at least one of an electronic board and another portable apparatus.

\* \* \* \* \*